(12) United States Patent
Nakamura et al.

(10) Patent No.: US 11,496,023 B2
(45) Date of Patent: Nov. 8, 2022

(54) DRIVE APPARATUS

(71) Applicant: NIDEC CORPORATION, Kyoto (JP)

(72) Inventors: Keigo Nakamura, Kyoto (JP); Daichi Furukawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 204 days.

(21) Appl. No.: 16/900,997

(22) Filed: Jun. 15, 2020

(65) Prior Publication Data

US 2020/0412208 A1   Dec. 31, 2020

(30) Foreign Application Priority Data

Jun. 28, 2019  (JP) .............................. JP2019-122154
Feb. 10, 2020  (JP) .............................. JP2020-020936

(51) Int. Cl.
*H02K 9/19* (2006.01)
*H02K 1/12* (2006.01)

(52) U.S. Cl.
CPC ................. *H02K 9/19* (2013.01); *H02K 1/12* (2013.01)

(58) Field of Classification Search
CPC .. H02K 1/27; H02K 1/20; H02K 1/14; H02K 1/32; H02K 1/276; H02K 1/2786; H02K 1/2766; H02K 1/02; H02K 3/24; H02K 3/522; H02K 3/04; H02K 7/14; H02K 9/19; H02K 5/203; H02K 5/20; H02K 21/222
See application file for complete search history.

(56) References Cited

U.S. PATENT DOCUMENTS

2015/0295473 A1* 10/2015 Suzuki ..................... H02K 1/32
                                                                310/54
2018/0287452 A1* 10/2018 Kim ......................... H02K 5/20
2018/0287464 A1* 10/2018 Sung ........................ H02K 9/19

FOREIGN PATENT DOCUMENTS

JP               20199967 A        1/2019

* cited by examiner

*Primary Examiner* — Bryan R Perez

(74) *Attorney, Agent, or Firm* — Hauptman Ham, LLP

(57) ABSTRACT

A drive apparatus includes: a motor having a rotor and a stator core; a housing; and a first injection port to inject a refrigerant into the stator core. The stator core includes: a core body surrounding the rotor; and a fixing portion projecting radially outward from the core body and fixed to the housing. The fixing portion includes an upper fixing portion. The first injection port is lower than an end portion of the upper fixing portion. The upper fixing portion is on one circumferential side of the first injection port. The first injection port is open in a first direction facing a directly lower side or a second direction angled to the one circumferential side with respect to the first direction, and is facing a portion on the other circumferential side of a boundary with an end portion of the upper fixing portion on the other circumferential side.

20 Claims, 11 Drawing Sheets

DRIVE APPARATUS

CROSS-REFERENCE TO RELATED APPLICATIONS

The present invention claims priority under 35 U.S.C. § 119 to Japanese Application No. 2019-122154 filed on Jun. 28, 2019 and Japanese Application No. 2020-020936 filed on Feb. 10, 2020, the entire contents of which are incorporated herein by reference.

FIELD OF THE INVENTION

The present invention relates to a drive apparatus.

BACKGROUND

There is known a rotary electric machine that includes a refrigerant injection portion that injects a refrigerant into a stator core. For example, there is known a rotary electric machine including a pipe as a refrigerant injection portion.

In the above rotary electric machine, there is a demand for more efficient cooling of the stator core by the refrigerant injected through the refrigerant injection portion.

SUMMARY

An exemplary drive apparatus of the present invention includes: a motor having a rotor rotatable about a motor axis extending in a direction intersecting a vertical direction and a stator core located radially outside the rotor; a housing that houses the motor inside; and a first refrigerant injection portion having an injection port to inject a refrigerant into the stator core. The stator core includes: a cylindrical stator core body whose outer circumferential surface surrounds the rotor; and a fixing portion that projects radially outward from the stator core body and is fixed to the housing. The fixing portion includes an upper fixing portion that is arranged to project upward in the vertical direction from the stator core body. The injection port includes a first injection port that is located on a lower side in the vertical direction with respect to an end portion of the upper fixing portion on an upper side in the vertical direction. The upper fixing portion is located on one circumferential side of the first injection port. A direction in which the first injection port is open is a direction facing a directly lower side in the vertical direction or a direction that is angled to the one circumferential side with respect to the direction facing the directly lower side in the vertical direction, and is a direction facing a portion located on the other circumferential side of a boundary with an end portion of the upper fixing portion on the other circumferential side on the outer circumferential surface of the stator core body.

An exemplary drive apparatus of the present invention includes: a motor having a rotor rotatable about a motor axis extending in a direction intersecting a vertical direction and a stator core located radially outside the rotor; a housing that houses the motor inside; and a first refrigerant injection portion having an injection port to inject a refrigerant into the stator core. The stator core includes: a cylindrical stator core body whose outer circumferential surface surrounds the rotor; and a fixing portion that is arranged to project radially outward from the stator core body and is fixed to the housing. The fixing portion includes an upper fixing portion that is arranged to project upward in the vertical direction from the stator core body. The injection port includes a first injection port that is located on a lower side in the vertical direction with respect to an end portion of the upper fixing portion on an upper side in the vertical direction. The upper fixing portion is located on one circumferential side of the first injection port. A direction in which the first injection port is open is a direction that is angled to the one circumferential side with respect to a direction facing the motor axis, and is a direction facing a portion located on the other circumferential side of a boundary with an end portion of the upper fixing portion on the other circumferential side on the outer circumferential surface of the stator core body.

The above and other elements, features, steps, characteristics and advantages of the present disclosure will become more apparent from the following detailed description of the preferred embodiments with reference to the attached drawings.

DETAILED DESCRIPTION

Figure 1:
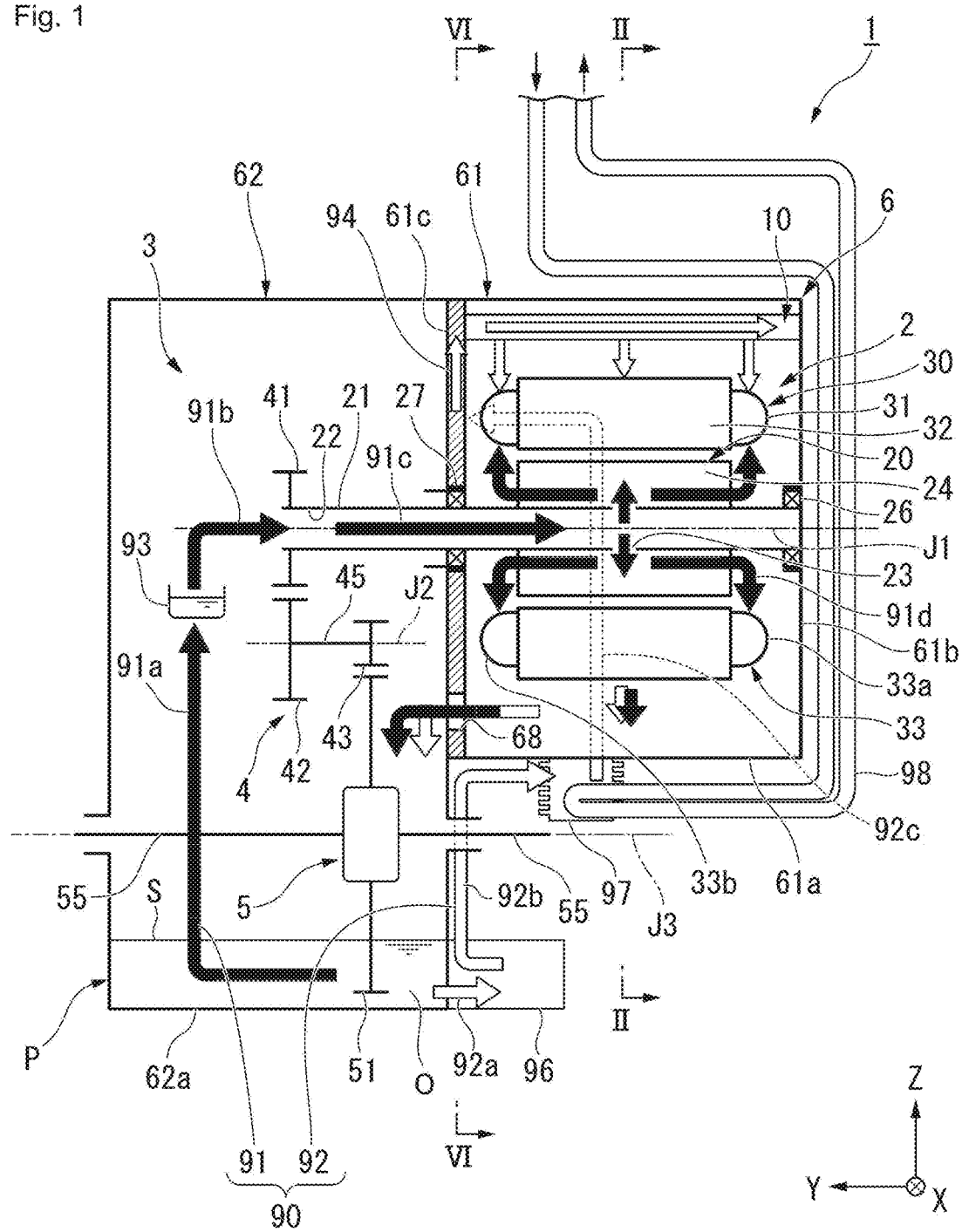
FIG. 1 is a schematic configuration diagram schematically showing a drive apparatus according to a first preferred embodiment.

The following description will be made with a vertical direction being defined on the basis of positional relationships in the case where a drive apparatus according to each preferred embodiment is installed in a vehicle located on a horizontal road surface. That is, it is sufficient that the relative positional relationships with respect to the vertical direction described in each of the following preferred embodiments are satisfied at least in the case where the drive apparatus is installed in the vehicle located on the horizontal road surface.

In the drawings, an xyz coordinate system is shown appropriately as a three-dimensional orthogonal coordinate system. In the xyz coordinate system, a z-axis direction corresponds to the vertical direction. A +z side corresponds to an upper side in the vertical direction, while a −z side corresponds to a lower side in the vertical direction. In the following description, the upper side and the lower side in the vertical direction will be referred to simply as the "upper side" and the "lower side", respectively. An x-axis direction corresponds to a front-rear direction of the vehicle in which the drive apparatus is installed, i.e., a direction perpendicular to the z-axis direction. In each of the following preferred embodiments, a +x side corresponds to a forward side of the vehicle, while a −x side corresponds to a rearward side of the vehicle. A y-axis direction corresponds to a left-right direction of the vehicle, i.e., a width direction of the vehicle, and is a direction perpendicular to both the x-axis direction and the z-axis direction. In each of the preferred embodiments described below, a +y side corresponds to a left side of the vehicle, while a −y side corresponds to a right side of the vehicle. Each of the front-rear direction and the left-right direction is a horizontal direction perpendicular to the vertical direction.

Note that the positional relationship in the front-rear direction is not limited to the positional relationship of the each of the following embodiments, and that the +x side and the −x side may correspond to the rearward side and the forward side, respectively, of the vehicle. In this case, the +y side corresponds to the right side of the vehicle, while the −y side corresponds to the left side of the vehicle.

A motor axis J1 shown in each drawing as appropriate extends in a direction intersecting the vertical direction. More specifically, the motor axis J1 extends in the y-axis direction perpendicular to the vertical direction, that is, in the left-right direction of the vehicle. In the following description, unless otherwise specified, a direction parallel to the motor axis J1 will be simply referred to by the term "axial direction", "axial", or "axially", radial directions centered on the motor axis J1 will be simply referred to by the term "radial direction", "radial", or "radially", and a circumferential direction centered on the motor axis J1, i.e., a circumferential direction about the motor axis J1, will be simply referred to by the term "circumferential direction", "circumferential", or "circumferentially". In addition, a side of the circumferential direction that advances counterclockwise as viewed from the left side (i.e., the +y side) of the vehicle is referred to by "one circumferential side", and a side of the circumferential direction that advances clockwise as viewed from the left side of the vehicle is referred to by "the other circumferential side". The one circumferential side is a side in which an arrow θ appropriately shown in each drawing advances, and the other circumferential side is a side opposite to the side in which the arrow θ advances. It is assumed that the term "parallel" as used herein includes both "parallel" and "substantially parallel", and that the term "perpendicular" as used herein includes both "perpendicular" and "substantially perpendicular".

The drive apparatus 1 according to the present preferred embodiment illustrated in FIG. 1 is installed in a vehicle having a motor as a power source, such as, for example, a hybrid electric vehicle (HEV), a plug-in hybrid vehicle (PHV), or an electric vehicle (EV), and is used as the power source thereof. Referring to FIG. 1, the drive apparatus 1 includes a motor 2, a transmission 3 including a reduction gear 4 and a differential 5, a housing 6, an oil pump 96, a cooler 97, and a refrigerant injection portion 10. Note that, the drive apparatus 1 does not include an inverter unit in the present preferred embodiment. In other words, the drive apparatus 1 has a structure separate from the inverter unit.

The housing 6 is arranged to house the motor 2 and the transmission 3 in an interior thereof. The housing 6 includes a motor housing portion 61, a gear housing portion 62, and a partition 61c. The motor housing portion 61 is arranged to house a stator 30 and a rotor 20, which will be described below, in an interior thereof. The motor housing portion 61 surrounds a stator core 32, which will be described below, from radially outside. The gear housing portion 62 is arranged to house the transmission 3 in an interior thereof. The gear housing portion 62 is located on the left side of the motor housing portion 61. A bottom portion 61a of the motor housing portion 61 is located higher than a bottom portion 62a of the gear housing portion 62. The partition 61c is arranged to divide the interior of the motor housing portion 61 and the interior of the gear housing portion 62 in an axial direction. The partition 61c includes a partition opening 68 defined therein. The partition opening 68 is arranged to join the interior of the motor housing portion 61 and the interior of the gear housing portion 62 to each other. The partition 61c is located on the left side of the stator 30.

The housing 6 is arranged to house an oil O as a coolant in the interior thereof. In the present preferred embodiment, the oil O is housed in the interior of the motor housing portion 61 and the interior of the gear housing portion 62. An oil pool P, i.e., a pool of the oil O, is arranged in a lower region in the interior of the gear housing portion 62. The oil O in the oil pool P is sent to the interior of the motor housing portion 61 through an oil passage 90, which will be described below. The oil O sent to the interior of the motor housing portion 61 is gathered in a lower region in the interior of the motor housing portion 61. At least a portion of the oil O gathered in the interior of the motor housing portion 61 travels into the gear housing portion 62 through the partition opening 68 to return to the oil pool P.

Note that, when an oil is herein described as being housed in a specific portion, it means that the oil is located in the specific portion at least at one time while the motor is in operation, and the oil may not be located in the specific portion when the motor is at rest. For example, when the oil O is described as being housed in the interior of the motor housing portion 61 in the present preferred embodiment, it means that the oil O is located in the interior of the motor housing portion 61 at least at one time while the motor 2 is in operation, and all of the oil O in the interior of the motor housing portion 61 may have traveled into the gear housing portion 62 through the partition opening 68 when the motor 2 is at rest. Note that a portion of the oil O sent to the interior of the motor housing portion 61 through the oil passage 90, which will be described below, may be left in the interior of the motor housing portion 61 when the motor 2 is at rest.

The oil O is arranged to circulate through the oil passage 90, which will be described below. The oil O is used to lubricate the reduction gear 4 and the differential 5. In addition, the oil O is also used to cool the motor 2. An oil equivalent to a lubricating oil (ATF: Automatic Transmission Fluid) for an automatic transmission having a relatively low viscosity is preferably used as the oil O so that the oil O can perform functions of a lubricating oil and a cooling oil.

Figure 2:
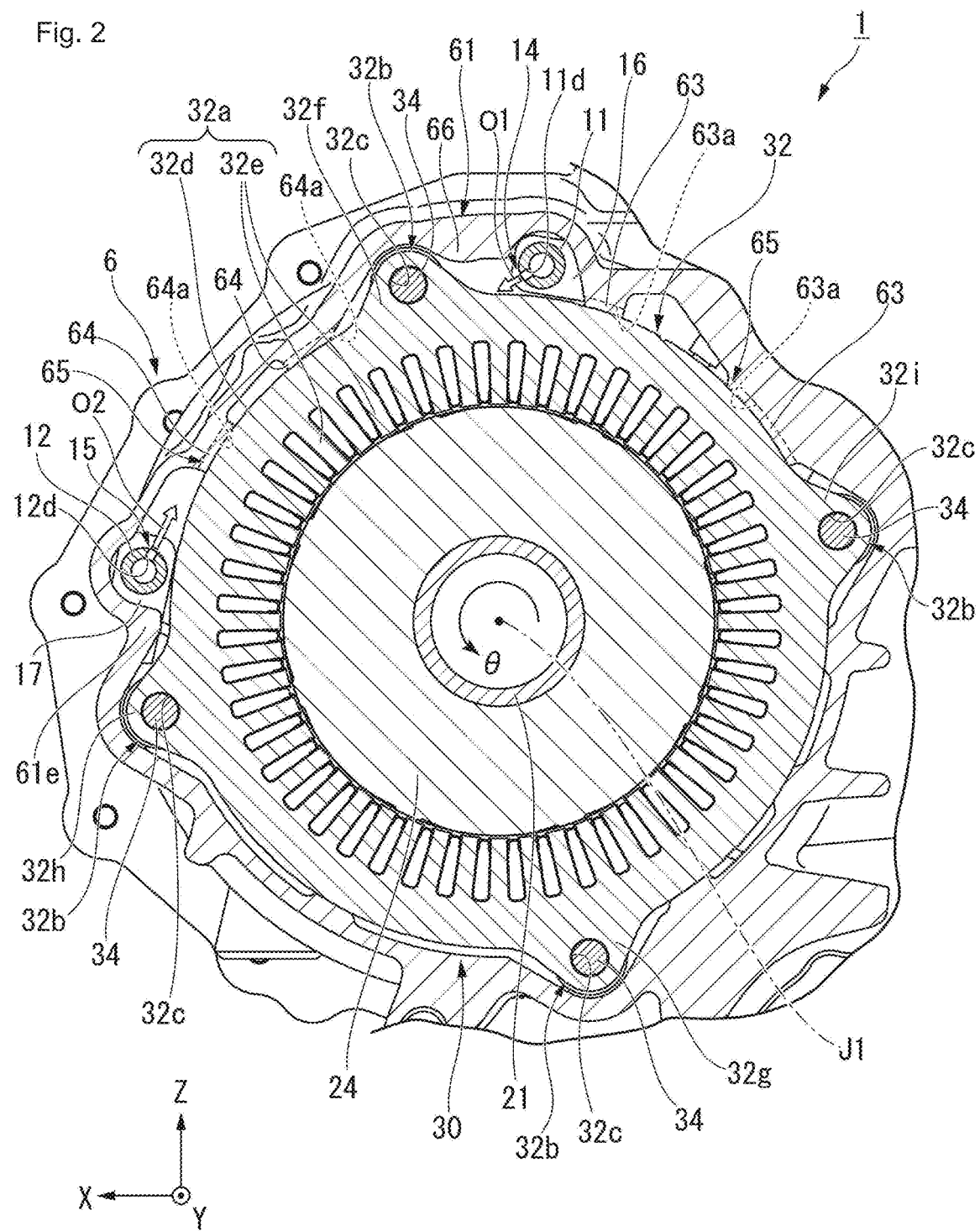
FIG. 2 is a sectional view of a part of the drive apparatus according to the first preferred embodiment, and is a sectional view taken along line II-II in FIG. 1.
Figure 3:
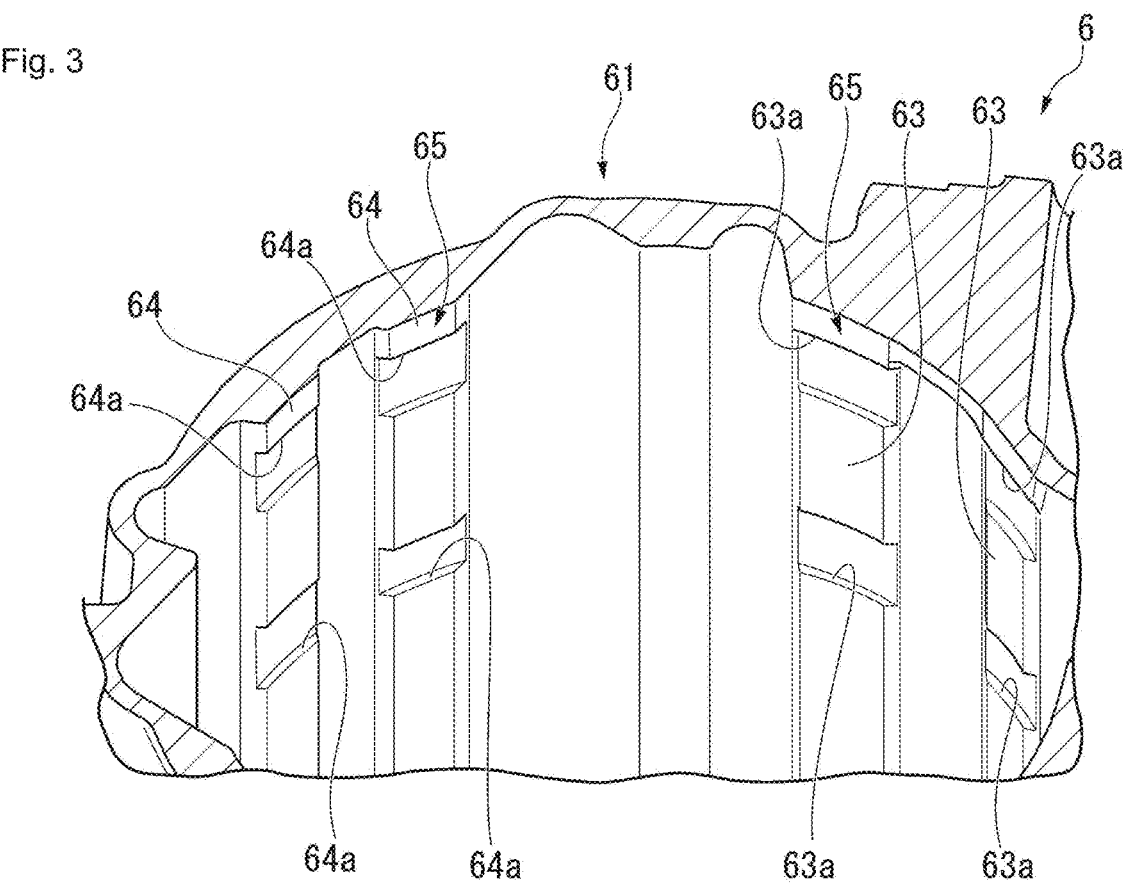
FIG. 3 is a partial sectional perspective view showing a part of a housing according to the first preferred embodiment.

Referring to FIGS. 2 and 3, the housing 6 has a support portion 65 that is arranged to project radially inward from an inner peripheral surface of the motor housing portion 61. The support portion 65 comes into contact with an outer circumferential surface of a stator core body 32a which will be described below. The support portion 65 includes a first support portion 63 and a second support portion 64. In the present preferred embodiment, a plurality of the first support portions 63 and a plurality of the second support portions 64 are provided. For example, two first support portions 63 and two second support portions 64 are provided. The two first support portions 63 are arranged with an interval in the circumferential direction. The two second support portions 64 are arranged with an interval in the circumferential direction. In the present preferred embodiment, the first support portion 63 is located on the upper side of the motor axis J1 and on the rearward side of the motor axis J1. In the present preferred embodiment, the second support portion 64 is located on the upper side of the motor axis J1 and on the forward side of the motor axis J1.

Referring to FIG. 3, the first support portion 63 and the second support portion 64 extend in the axial direction. A radially inner surface of the first support portion 63 and a radially inner surface of the second support portion 64 are curved surfaces. Referring to FIG. 2, the radially inner surface of the first support portion 63 and the radially inner surface of the second support portion 64 are arc-shaped with the motor axis J1 as the center as viewed in the axial direction. The radially inner surface of the first support portion 63 and the radially inner surface of the second support portion 64 come into contact with the outer circumferential surface of the stator core body 32a which will be described below.

Referring to FIG. 3, the first support portion 63 has a first through groove 63a that penetrates through the first support portion 63 in the circumferential direction. The first through groove 63a is recessed radially outward. A plurality of the first through grooves 63a are provided, for example, with an interval in the axial direction for each of the first support portions 63. For example, two first through grooves 63a are provided for each of the first support portions 63. The respective axial positions of the two first through grooves 63a provided in one of the first support portions 63 are, for example, the same as the respective axial positions of the two first through grooves 63a provided in the other first support portion 63.

The second support portion 64 has a second through groove 64a that penetrates through the second support portion 64 in the circumferential direction. The second through groove 64a is recessed radially outward. A plurality of the second through grooves 64a are provided, for example, with an interval in the axial direction for each of the second support portions 64. For example, two second through grooves 64a are provided for each of the second support portions 64. The respective axial positions of the two second through grooves 64a provided in one of the second support portions 64 are, for example, the same as the respective axial positions of the two second through grooves 64a provided in the other second support portion 64.

The axial position of one of the first through grooves 63a in each of the first support portions 63 and the axial position of one of the second through grooves 64a in each of the second support portions 64 are, for example, the same. The axial position of the other first through grooves 63a in each of the first support portions 63 and the axial position of the other second through grooves 64a in each of the second support portions 64 are, for example, the same.

Note that, in the present specification, the expression, "certain parameters are the same as each other" includes not only a case where the certain parameters are exactly the same as each other but also a case where the certain parameters are substantially the same as each other. The expression, "the certain parameters are substantially the same as each other" includes, for example, a case where the certain parameters slightly deviate from each other within a tolerance range.

Referring to FIG. 2, the housing 6 has a projecting portion 66 provided on the inner peripheral surface of the motor housing portion 61. The projecting portion 66 is arranged to project radially inward from the inner peripheral surface of the motor housing portion 61. The projecting portion 66 is arranged to project toward the stator core 32 which will be described below. The projecting portion 66 is located between an upper fixing portion 32f and a first refrigerant injection portion 11, which will be described below, in the circumferential direction. More specifically, a radially inner end portion of the projecting portion 66 is located between an upper end portion of the upper fixing portion 32f and an upper end portion of the first refrigerant injection portion 11 in the circumferential direction.

In the present preferred embodiment, the motor 2 is an inner-rotor motor. The motor 2 includes the rotor 20, the stator 30, and bearings 26 and 27. The rotor 20 is arranged to be capable of rotating about the motor axis J1, which extends in a horizontal direction. The rotor 20 includes a shaft 21 and a rotor body 24. Although not illustrated in the drawings, the rotor body 24 includes a rotor core, and a rotor magnet fixed to the rotor core. A torque of the rotor 20 is transferred to the transmission 3.

The shaft 21 is arranged to extend in the axial direction with the motor axis J1 as a center. The shaft 21 is arranged to rotate about the motor axis J1. The shaft 21 is a hollow shaft including a hollow portion 22 defined therein. The shaft 21 includes a communicating hole 23 defined therein. The communicating hole 23 is arranged to extend in a radial direction to join the hollow portion 22 to a space outside of the shaft 21.

The shaft 21 is arranged to extend over the interior of the motor housing portion 61 and the interior of the gear housing portion 62 of the housing 6. An end portion of the shaft 21 on the left side is arranged to project into the interior of the gear housing portion 62. A first gear 41, which will be described below, of the transmission 3 is fixed to the end portion of the shaft 21 on the left side. The shaft 21 is rotatably supported by the bearings 26 and 27.

The stator 30 is arranged radially opposite to the rotor 20 with a gap therebetween. In more detail, the stator 30 is located radially outside of the rotor 20. The stator 30 includes a stator core 32 and a coil assembly 33. That is, the motor 2 includes the stator core 32 and the coil assembly 33. The stator core 32 is located on the radially outside the rotor 20. The stator core 32 surrounds the rotor 20. The stator core 32 is fixed to an inner peripheral surface of the motor housing portion 61.

Figure 4:
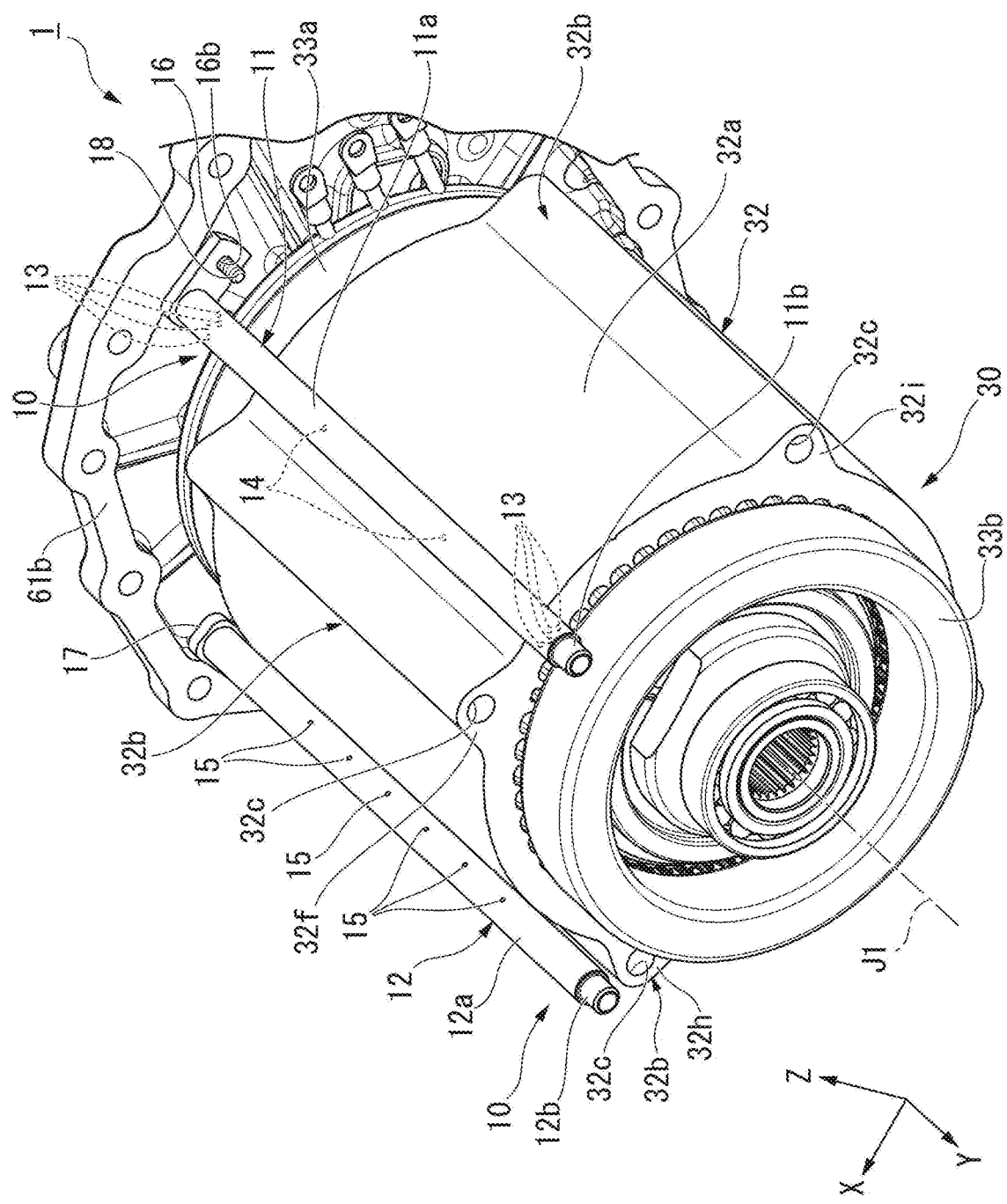
FIG. 4 is a perspective view showing a stator, a first refrigerant injection portion, and a second refrigerant injection portion according to the first preferred embodiment.

Referring to FIGS. 2 and 4, the stator core 32 includes the stator core body 32a and fixing portions 32b. The outer circumferential surface of the stator core body 32a has a cylindrical shape that surrounds the rotor 20. The outer circumferential surface of the stator core body 32a has, for example, a cylindrical shape centered on the motor axis J1. Referring to FIG. 2, the stator core body 32a includes a cylindrical core back 32d extending in the axial direction, and a plurality of teeth 32e extending radially inward from the core back 32d. An outer circumferential surface of the core back 32d is the outer circumferential surface of the stator core body 32a. The teeth 32e are arranged at regular intervals in the circumferential direction all the way around the motor axis J1.

Each fixing portion 32b is arranged to project radially outward from an outer circumferential surface of the stator core body 32*a*. The fixing portion 32*b* is a portion fixed to the housing 6. Referring to FIG. 4, each of the fixing portions 32*b* is arranged to extend in the axial direction. The fixing portion 32*b* is arranged to extend, for example, from an end portion of the stator core body 32*a* on the left side (i.e., the +y side) to an end portion of the stator core body 32*a* on the right side (i.e., the −y side). The fixing portions 32*b*, the number of which is more than one, are arranged apart from one another in the circumferential direction. Referring to FIG. 2, four fixing portions 32*b* are provided, for example.

The fixing portion 32*b* includes an upper fixing portion 32*f*, a lower fixing portion 32*g*, a front fixing portion 32*h*, and a rear fixing portion 32*i*. The upper fixing portion 32*f* is arranged to project upward from the stator core body 32*a*. The lower fixing portion 32*g* is arranged to project downward from the stator core body 32*a*. The front fixing portion 32*h* is arranged to project forward from the stator core body 32*a*. The rear fixing portion 32*i* is arranged to project rearward from the stator core body 32*a*. The upper fixing portion 32*f*, the lower fixing portion 32*g*, the front fixing portion 32*h*, and the rear fixing portion 32*i* are, for example, arranged at regular intervals over the circumference in the circumferential direction.

Note that it suffices that "projection of a certain object to a certain side from another object" is projection of the certain object in a direction of being located on the certain side as moving away from the other object in the present specification. For example, it suffices that a state where "the fixing portion 32*b* projects upward from the stator core body 32*a*" is a state where the fixing portion 32*b* projects in a direction of being located upward as moving away radially outward from the stator core body 32*a*. That is, the state where "the fixing portion 32*b* projects upward from the stator core body 32*a*" includes, for example, a state where the fixing portion 32*b* projects to the directly upper side from the stator core body 32*a* in the vertical direction and a state where the fixing portion 32*b* projects from the stator core body 32*a* in a direction angled within a range of less than 90° with respect to the directly upper side in the vertical direction.

If the fixing portion 32*b* projects in the direction of being located upward as moving away radially outward from the stator core body 32*a* in a case where the fixing portion 32*b* is arranged to project radially outward from a cylindrical surface centered on the motor axis J1 as in the present preferred embodiment, a radially outer end portion of the fixing portion 32*b* is located above the motor axis J1. That is, in the present preferred embodiment, "the fixing portion 32*b* is arranged to project upward from the stator core body 32*a*" also includes that the radially outer end portion of the fixing portion 32*b* is located above the motor axis J1.

Figure 5:
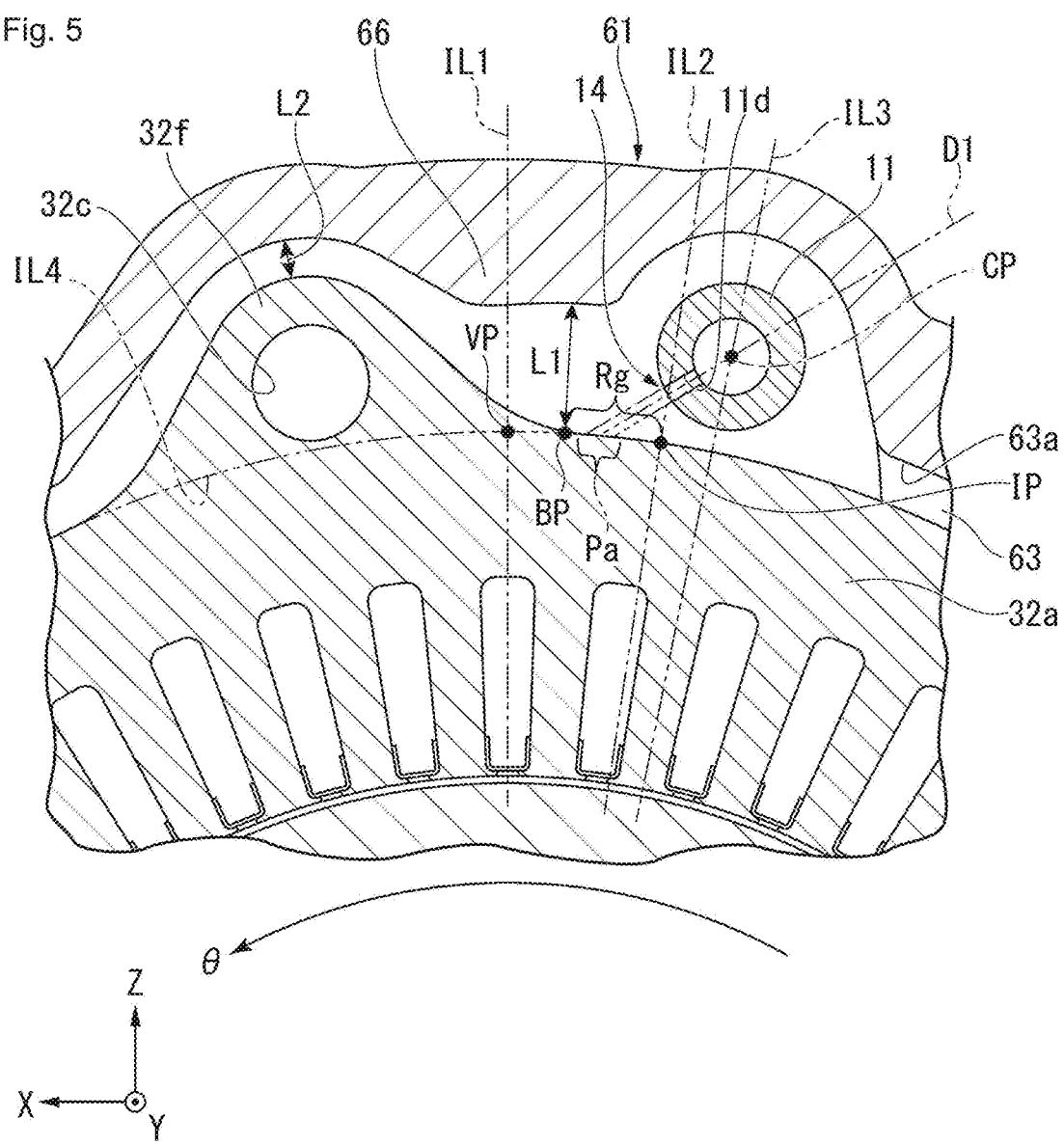
FIG. 5 is a sectional view showing a part of a stator core and the first refrigerant injection portion according to the first preferred embodiment, and is a partially enlarged view of FIG. 2.

The upper fixing portion 32*f* is arranged to project, for example, obliquely forward and upward. A radially outer end portion of the upper fixing portion 32*f* is located above the motor axis J1. The upper fixing portion 32*f* is arranged away from the inner peripheral surface of the motor housing portion 61. Referring to FIG. 5, a circumferential dimension of the upper fixing portion 32*f* becomes smaller toward the outside in the radial direction. An outer shape of the radially outer end portion of the upper fixing portion 32*f* is an arc shape that is convex radially outward as viewed in the axial direction. The radially outer end portion of the upper fixing portion 32*f* is located above the upper end portion of the stator core body 32*a*.

A surface of the upper fixing portion 32*f* on the other circumferential side (i.e., the −θ side) is located on the lower side toward the other circumferential side. In the present preferred embodiment, the surface of the upper fixing portion 32*f* on the other circumferential side is a curved surface. The surface of the upper fixing portion 32*f* on the other circumferential side is smoothly joined to the outer circumferential surface of the stator core body 32*a* at a boundary BP with an end portion of the upper fixing portion 32*f* on the other circumferential side (i.e., the −θ side) in the outer circumferential surface of the stator core body 32*a*.

The upper end portion of the upper fixing portion 32*f* is located on the one circumferential side (i.e., the +θ side) with respect to an upper vertex VP of the stator core body 32*a*. The vertex VP is a portion located on the uppermost side in the outer circumferential surface of the stator core body 32*a*. As viewed in the axial direction, the vertex VP is a portion of the outer circumferential surface of the stator core body 32*a* that intersects with an imaginary line IL1 extending in the vertical direction through the motor axis J1.

In the present preferred embodiment, an end portion of the upper fixing portion 32*f* on the one circumferential side (i.e., the +θ side) is located on the one circumferential side with respect to the vertex VP. The end portion of the upper fixing portion 32*f* on the other circumferential side (i.e., the −θ side) is located on the other circumferential side with respect to the vertex VP. That is, the upper fixing portion 32*f* is provided at the position of the vertex VP in the present preferred embodiment. More specifically, the portion on the other circumferential side of the upper fixing portion 32*f* is provided at the position of the vertex VP.

Therefore, the vertex VP is not visually recognizable from the outside. In this case, the vertex VP is located on an imaginary curve IL4 that virtually indicates the outer circumferential surface of the stator core body 32*a* in the portion where the upper fixing portion 32*f* is provided as shown in FIG. 5. The imaginary curve IL4 has an arc shape centered on the motor axis J1 and smoothly joins portions of the outer circumferential surface of the stator core body 32*a* located on both the circumferential sides of the upper fixing portion 32*f*. In this manner, when the upper vertex of the stator core body 32*a* is not visually recognizable due to the fixing portion 32*b* or the like, a portion, located on the uppermost side on an imaginary extension line assumed from a visually recognizable portion, in the outer circumferential surface of the stator core body 32*a* is set as the upper vertex of the stator core body 32*a*.

In the present preferred embodiment, the boundary BP with the end portion on the other circumferential side (i.e., the −θ side) of the upper fixing portion 32*f* in the outer circumferential surface of the stator core body 32*a* is located on the other circumferential side with respect to the vertex VP. A radial distance L2 between the upper fixing portion 32*f* and the inner peripheral surface of the motor housing portion 61 is at least partially smaller than a radial distance L1 between the boundary BP and the inner peripheral surface of the motor housing portion 61. In the present preferred embodiment, the distance L2 is smaller than the distance L1 in any portion of the upper fixing portion 32*f*. In the present preferred embodiment, the distance L1 is the radial distance between the boundary BP and a radially inner surface of the projecting portion 66.

Referring to FIG. 2, the lower fixing portion 32*g* is arranged to project, for example, obliquely downward and rearward. The front fixing portion 32*h* is arranged to project, for example, obliquely downward and forward. The rear fixing portion 32*i* is arranged to project, for example, obliquely upward and rearward. In the present preferred embodiment, the lower fixing portion 32*g*, the front fixing portion 32h, and the rear fixing portion 32i are arranged away from the inner peripheral surface of the motor housing portion 61. A shape of the lower fixing portion 32g, a shape of the front fixing portion 32h, and a shape of the rear fixing portion 32i are the same as, for example, a shape of the upper fixing portion 32f.

The fixing portion 32b includes a through hole 32c arranged to pass through the fixing portion 32b in the axial direction. A bolt 34 extending in the axial direction is arranged to pass through the through hole 32c. The bolt 34 is inserted into the through hole 32c from the right side (i.e., the −y side), and is screwed into a female screw hole 35 illustrated in FIG. 6. The female screw hole 35 is defined in the partition 61c. As a result of the bolt 34 being screwed into the female screw hole 35, the fixing portion 32b is fixed to the partition 61c. The stator 30 is thus fixed to the housing 6 through the bolts 34.

Referring to FIG. 1, the coil assembly 33 includes a plurality of coils 31 attached to the stator core 32 and arranged along the circumferential direction. Each of the coils 31 is attached to a separate one of the teeth 32e of the stator core 32 with an insulator (not shown) therebetween. The coils 31 are arranged along the circumferential direction. In more detail, the coils 31 are arranged at regular intervals in the circumferential direction all the way around the motor axis J1. Although not illustrated in the drawings, the coil assembly 33 may include a binding member or the like which is used to bind the coils 31 together, and may include a passage line arranged to join the coils 31 to one another.

The coil assembly 33 includes coil ends 33a and 33b each of which is arranged to project in the axial direction from the stator core 32. The coil end 33a is arranged to project to the right side from the stator core 32. The coil end 33b is arranged to project to the left side from the stator core 32. The coil end 33a includes a portion of each of the coils 31 included in the coil assembly 33 which projects on the right side of the stator core 32. The coil end 33b includes a portion of each of the coils 31 included in the coil assembly 33 which projects on the left side of the stator core 32. Referring to FIG. 4, in the present preferred embodiment, each of the coil ends 33a and 33b is in the shape of a circular ring, and is centered on the motor axis J1. Although not illustrated in the drawings, each of the coil ends 33a and 33b may include a binding member or the like which is used to bind the coils 31 together, and may include a passage line arranged to join the coils 31 to one another.

Referring to FIG. 1, the bearings 26 and 27 are arranged to rotatably support the rotor 20. Each of the bearings 26 and 27 is, for example, a ball bearing. The bearing 26 is a bearing arranged to rotatably support a portion of the rotor 20 which is located on the right side of the stator core 32. In the present preferred embodiment, the bearing 26 is arranged to support a portion of the shaft 21 which is located on the right side of a portion of the shaft 21 to which the rotor body 24 is fixed. The bearing 26 is held by a wall portion 61b of the motor housing portion 61 which covers the right side of the rotor 20 and the stator 30.

The bearing 27 is a bearing arranged to rotatably support a portion of the rotor 20 which is located on the left side of the stator core 32. In the present preferred embodiment, the bearing 27 is arranged to support a portion of the shaft 21 which is located on the left side of the portion of the shaft 21 to which the rotor body 24 is fixed. The bearing 27 is held by the partition 61c.

The transmission 3 is housed in the gear housing portion 62 of the housing 6. The transmission 3 is connected to the motor 2. In more detail, the transmission 3 is connected to the end portion of the shaft 21 on the left side. The transmission 3 includes the reduction gear 4 and the differential 5. A torque outputted from the motor 2 is transferred to the differential 5 through the reduction gear 4.

The reduction gear 4 is connected to the motor 2. The reduction gear 4 is arranged to increase the torque outputted from the motor 2 in accordance with a reduction ratio while reducing the rotation speed of the motor 2. The reduction gear 4 is arranged to transfer the torque outputted from the motor 2 to the differential 5. The reduction gear 4 includes the first gear 41, a second gear 42, a third gear 43, and an intermediate shaft 45.

The first gear 41 is fixed to an outer circumferential surface of the end portion of the shaft 21 on the left side. The first gear 41 is arranged to rotate about the motor axis J1 together with the shaft 21. The intermediate shaft 45 is arranged to extend along an intermediate axis J2 parallel to the motor axis J1. The intermediate shaft 45 is arranged to rotate about the intermediate axis J2. Each of the second gear 42 and the third gear 43 is fixed to an outer circumferential surface of the intermediate shaft 45. The second gear 42 and the third gear 43 are connected to each other through the intermediate shaft 45. Each of the second gear 42 and the third gear 43 is arranged to rotate about the intermediate axis J2. The second gear 42 is arranged to mesh with the first gear 41. The third gear 43 is arranged to mesh with a ring gear 51, which will be described below, of the differential 5.

The torque outputted from the motor 2 is transferred to the ring gear 51 of the differential 5 through, in order, the shaft 21, the first gear 41, the second gear 42, the intermediate shaft 45, and the third gear 43. The number of gears, the gear ratios of the gears, and so on can be modified in various manners in accordance with a desired reduction ratio. In the present preferred embodiment, the reduction gear 4 is a speed reducer of a parallel-axis gearing type, in which center axes of gears are arranged in parallel with each other.

The differential 5 is connected to the motor 2 through the reduction gear 4. The differential 5 is a device arranged to transfer the torque outputted from the motor 2 to wheels of the vehicle. The differential 5 is arranged to transfer the same torque to axles 55 of left and right wheels while absorbing a difference in speed between the left and right wheels when the vehicle is turning. Thus, in the present preferred embodiment, the transmission 3 is arranged to transfer the torque of the motor 2 to the axles 55 of the vehicle through the reduction gear 4 and the differential 5. The differential 5 includes the ring gear 51, a gear housing (not shown), a pair of pinion gears (not shown), a pinion shaft (not shown), and a pair of side gears (not shown). The ring gear 51 is arranged to rotate about a differential axis J3 parallel to the motor axis J1. The torque outputted from the motor 2 is transferred to the ring gear 51 through the reduction gear 4.

The motor 2 is provided with the oil passage 90, through which the oil O circulates in the interior of the housing 6. The oil passage 90 is a channel of the oil O along which the oil O is fed from the oil pool P to the motor 2 and is led back to the oil pool P. The oil passage 90 is arranged to extend over both the interior of the motor housing portion 61 and the interior of the gear housing portion 62.

Note that the term "oil passage" as used herein refers to a channel of an oil.

Therefore, the concept of "oil passage" includes not only a "flow passage", in which a steady flow of an oil in one direction is generated, but also a channel in which the oil is allowed to temporarily stay, and a channel along which the oil drips. Examples of the channel in which the oil is allowed to temporarily stay include a reservoir arranged to store the oil.

The oil passage 90 includes a first oil passage 91 and a second oil passage 92. Each of the first oil passage 91 and the second oil passage 92 is arranged to circulate the oil O in the interior of the housing 6. The first oil passage 91 includes a scraping-up channel 91a, a shaft feed channel 91b, an intra-shaft channel 91c, and an intra-rotor channel 91d. In addition, a first reservoir 93 is arranged in a channel of the first oil passage 91. The first reservoir 93 is arranged in the interior of the gear housing portion 62.

The scraping-up channel 91a is a channel along which the oil O is scraped up from the oil pool P by rotation of the ring gear 51 of the differential 5 to be received by the first reservoir 93. The first reservoir 93 is arranged to open upward. The first reservoir 93 receives a portion of the oil O which has been scraped up by the ring gear 51. The first reservoir 93 also receives portions of the oil O which have been scraped up by the second gear 42 and the third gear 43 in addition to the ring gear 51 when, for example, a liquid surface S of the oil pool P is at a high level, e.g., immediately after the motor 2 is started.

The shaft feed channel 91b is arranged to lead the oil O from the first reservoir 93 into the hollow portion 22 of the shaft 21. The intra-shaft channel 91c is a channel along which the oil O passes in the hollow portion 22 of the shaft 21. The intra-rotor channel 91d is a channel along which the oil O passes through the communicating hole 23 of the shaft 21 and an interior of the rotor body 24, and is scattered to the stator 30.

In the intra-shaft channel 91c, a centrifugal force is applied to the oil O in an interior of the rotor 20 due to rotation of the rotor 20. Thus, the oil O is continuously scattered radially outward from the rotor 20. In addition, the scattering of the oil O generates a negative pressure in a channel in the interior of the rotor 20, causing the oil O gathered in the first reservoir 93 to be sucked into the interior of the rotor 20, so that the channel in the interior of the rotor 20 is filled with the oil O.

A portion of the oil O which has reached the stator 30 absorbs heat from the stator 30. Having cooled the stator 30, the oil O drips downward, and is gathered in the lower region in the interior of the motor housing portion 61. The oil O gathered in the lower region in the interior of the motor housing portion 61 travels into the gear housing portion 62 through the partition opening 68 defined in the partition 61c. In the above-described manner, the first oil passage 91 feeds the oil O to the rotor 20 and the stator 30.

In the second oil passage 92, the oil O is lifted from the oil pool P, and is fed to the stator 30. The oil pump 96, the cooler 97, and the refrigerant injection portion 10 are provided along the second oil passage 92. The second oil passage 92 includes a first flow passage 92a, a second flow passage 92b, a third flow passage 92c, and a fourth flow passage 94.

Each of the first flow passage 92a, the second flow passage 92b, and the third flow passage 92c is defined in a wall portion of the housing 6. The first flow passage 92a is arranged to join the oil pool P and the oil pump 96 to each other. The second flow passage 92b is arranged to join the oil pump 96 and the cooler 97 to each other. The third flow passage 92c is arranged to join the cooler 97 and the fourth flow passage 94 to each other. The third flow passage 92c is defined in, for example, a wall portion of the motor housing portion 61 on the forward side (i.e., the +x side).

Figure 6:
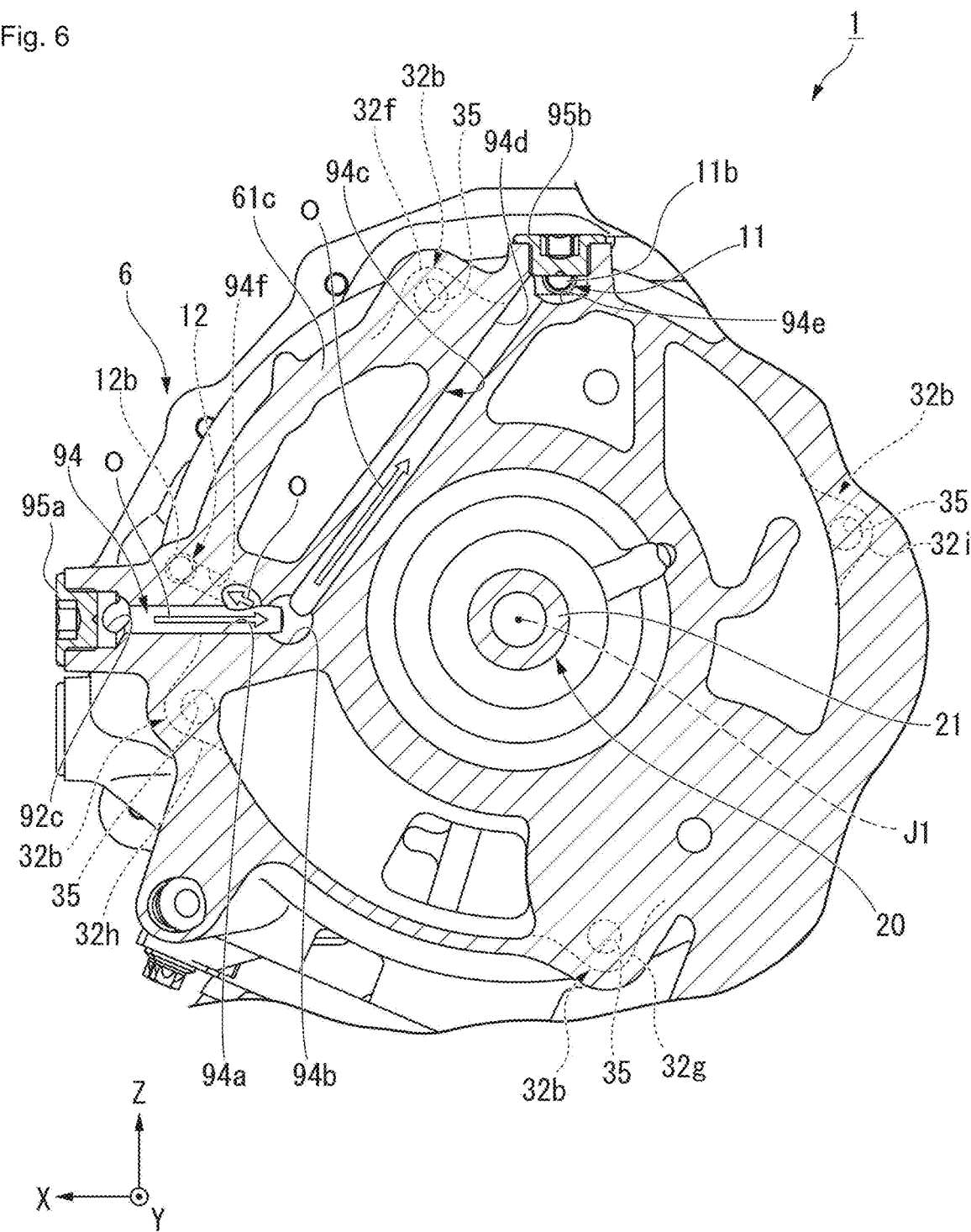
FIG. 6 is a sectional view of a part of the drive apparatus according to the first preferred embodiment, and is a sectional view taken along line VI-VI in FIG. 1.

The fourth flow passage 94 is defined in the partition 61c. The fourth flow passage 94 joins the first refrigerant injection portion 11 and a second refrigerant injection portion 12, which will be described below, in the refrigerant injection portion 10. Referring to FIG. 6, the fourth flow passage 94 includes an inflow portion 94a, a first branch portion 94c, and a second branch portion 94f. The inflow portion 94a is a portion of the fourth flow passage 94 which is arranged to receive an inflow of the oil O from the third flow passage 92c. The inflow portion 94a is arranged to extend to the rearward side (i.e., the −x side) from the third flow passage 92c. The inflow portion 94a is located on the forward side (i.e., the +x side) of the shaft 21, and is arranged to extend in a straight line in the front-rear direction, which is a radial direction. The inflow portion 94a is arranged to have an increased diameter at an end portion thereof on the forward side. In the present preferred embodiment, the end portion of the inflow portion 94a on the forward side is a radially outer end portion of the inflow portion 94a.

The end portion of the inflow portion 94a on the forward side (i.e., the +x side) is located radially outward of the fixing portions 32b. An end portion of the inflow portion 94a on the rearward side (i.e., the −x side) is located radially inward of the fixing portions 32b. That is, in the present preferred embodiment, the inflow portion 94a is arranged to extend in the front-rear direction from a position radially outward of the fixing portions 32b to a position radially inward of the fixing portions 32b. The inflow portion 94a is located above the front fixing portion 32h.

The end portion of the inflow portion 94a on the rearward side (i.e., the −x side) is a connection portion 94b at which each of the first branch portion 94c and the second branch portion 94f is joined to the inflow portion 94a. The inflow portion 94a is arranged to have an increased diameter at the connection portion 94b. The connection portion 94b is located radially inward of the fixing portions 32b.

A remaining portion of the inflow portion 94a excluding the connection portion 94b is made by, for example, performing a drilling process from the forward side (i.e., the +x side) of the housing 6 using a drill. The end portion of the inflow portion 94a on the forward side is closed by a bolt 95a fastened therein. The connection portion 94b of the inflow portion 94a is made by, for example, performing a drilling process from the left side (i.e., the +y side) of the partition 61c using a drill. Although not illustrated in the drawings, an end portion of the connection portion 94b on the left side is closed by a bolt fastened therein.

The first branch portion 94c is a portion that is arranged to branch from the inflow portion 94a and extend up to the first refrigerant injection portion 11 which will be described below. The first branch portion 94c is arranged to extend obliquely upward and rearward from the end portion of the inflow portion 94a on the rearward side (i.e., the −x side), i.e., the connection portion 94b. The first branch portion 94c is arranged to extend up to an upper end portion of the partition 61c passing through a portion of the partition 61c which is located below the upper fixing portion 32f and above the shaft 21. An upper end portion of the first branch portion 94c is arranged at substantially the same radial position as that of each fixing portion 32b. The upper end portion of the first branch portion 94c is located on the rearward side of the upper fixing portion 32f.

The first branch portion 94c includes an extending portion 94d arranged to extend obliquely upward and rearward in a straight line from the connection portion 94b, and a connection portion 94e joined to an upper end portion of the extending portion 94d. The connection portion 94e is the upper end portion of the first branch portion 94c, and is a portion to which the first refrigerant injection portion 11, which will be described below, is joined. The connection portion 94e is arranged to have a diameter greater than that of the extending portion 94d. The connection portion 94e is made by, for example, performing a drilling process from the upper side of the housing 6 using a drill. An upper end portion of the connection portion 94e is closed by a bolt 95b fastened therein. The extending portion 94d is made by, for example, performing a drilling process from the upper side of the housing 6 through the connection portion 94e using a drill. In this drilling process, the drill is moved obliquely downward and forward.

The second branch portion 94f is a portion that is arranged to branch from the inflow portion 94a and extend up to the second refrigerant injection portion 12 which will be described below. In the present preferred embodiment, the second branch portion 94f is arranged to extend obliquely upward and forward from the connection portion 94b. The second branch portion 94f is arranged to extend in a straight line, and is angled to the right side (i.e., the −y side) with respect to the front-rear direction. An end portion of the second branch portion 94f on the forward side (i.e., the +x side) is arranged at substantially the same radial position as that of each fixing portion 32b. The end portion of the second branch portion 94f on the forward side (i.e., the +x side) is located higher than the front fixing portion 32h. The end portion of the second branch portion 94f on the forward side and the front fixing portion 32h are arranged at substantially the same position in the front-rear direction. The second branch portion 94f is made by, for example, performing a drilling process from the left side (i.e., the +y side) of the partition 61c through the connection portion 94b using a drill.

In the fourth flow passage 94, a rearward portion of the inflow portion 94a, an entire portion of the extending portion 94d excluding the upper end portion thereof, and a rearward portion of the second branch portion 94f are defined in a portion of the partition 61c which lies radially inward of the fixing portions 32b. That is, in the present preferred embodiment, the fourth flow passage 94 includes portions each of which is arranged to pass radially inward of the fixing portions 32b.

Referring to FIG. 1, the refrigerant injection portion 10 extends in the axial direction. An end portion of the refrigerant injection portion 10 on the left side is fixed to the partition 61c. Referring to FIG. 4, the refrigerant injection portion 10 includes the first refrigerant injection portion 11 and the second refrigerant injection portion 12. That is, the drive apparatus 1 includes the first refrigerant injection portion 11 and the second refrigerant injection portion 12.

In the present preferred embodiment, the first refrigerant injection portion 11 and the second refrigerant injection portion 12 are pipes extending in the axial direction of the motor axis J1. More specifically, the first refrigerant injection portion 11 and the second refrigerant injection portion 12 are cylindrical shapes that extend in a straight line in the axial direction. The first refrigerant injection portion 11 and the second refrigerant injection portion 12 are parallel to each other. Referring to FIG. 2, the first refrigerant injection portion 11 and the second refrigerant injection portion 12 are housed inside the housing 6. The first refrigerant injection portion 11 and the second refrigerant injection portion 12 are located radially outside the stator 30. The first refrigerant injection portion 11 and the second refrigerant injection portion 12 are arranged with an interval therebetween in the circumferential direction. A radial position of the first refrigerant injection portion 11 and a radial position of the second refrigerant injection portion 12 are the same, for example.

Note that, in the present specification, the expression, "the first refrigerant injection portion and the second refrigerant injection portion extend in a straight line in the axial direction of the motor axis" includes not only a case where the first refrigerant injection portion and the second refrigerant injection portion extend in a straight line in the strictly axial direction but also a case where the first refrigerant injection portion and the second refrigerant injection portion extend in a straight line in the substantially axial direction. That is, when each of the first refrigerant injection portion 11 and the second refrigerant injection portion 12 is described as extending in a straight line in the axial direction in the present preferred embodiment, each of the first refrigerant injection portion 11 and the second refrigerant injection portion 12 may extend to be slightly angled with respect to the axial direction, for example. In this case, the first refrigerant injection portion 11 and the second refrigerant injection portion 12 may be angled either in the same direction or in different directions with respect to the axial direction.

In the present preferred embodiment, the first refrigerant injection portion 11 is located on the upper side of the stator 30. Here, in the present specification, the expression, "a certain object is located on one side in a predetermined direction with respect to another object" includes a case where the certain object and the other object overlap with each other and the certain object is located on the front side of the other object at the time of viewing the certain object and the other object from one side in the predetermined direction in a state where a drive apparatus is arranged on a horizontal plane. That is, in the present preferred embodiment, the first refrigerant injection portion 11 and the stator 30 overlap with each other, and the first refrigerant injection portion 11 is located on the front side of the stator 30 at the time of viewing the first refrigerant injection portion 11 and the stator 30 from above in a state where the drive apparatus 1 is arranged on a horizontal plane. Note that, in the present specification, "the state where the drive apparatus is arranged on the horizontal plane" includes a state where a vehicle in which the drive apparatus has been installed is arranged on a horizontal road surface.

The first refrigerant injection portion 11 is located on the upper side of the second refrigerant injection portion 12. In the present preferred embodiment, the radial position of the first refrigerant injection portion 11 is the same as the radial position of the fixing portion 32b. The first refrigerant injection portion 11 is located on the rearward side (i.e., the −x side) of the upper fixing portion 32f. The first refrigerant injection portion 11 is located on the other circumferential side (i.e., the −θ side) of the upper fixing portion 32f. A radial position at a radially outer end portion of the first refrigerant injection portion 11 is substantially the same as a radial position at the radially outer end portion of the upper fixing portion 32f. The first refrigerant injection portion 11 is located between the upper fixing portion 32f and the first support portion 63 in the circumferential direction. In the present preferred embodiment, the first support portion 63 is located on the other circumferential side of the first refrigerant injection portion 11.

Figure 7:
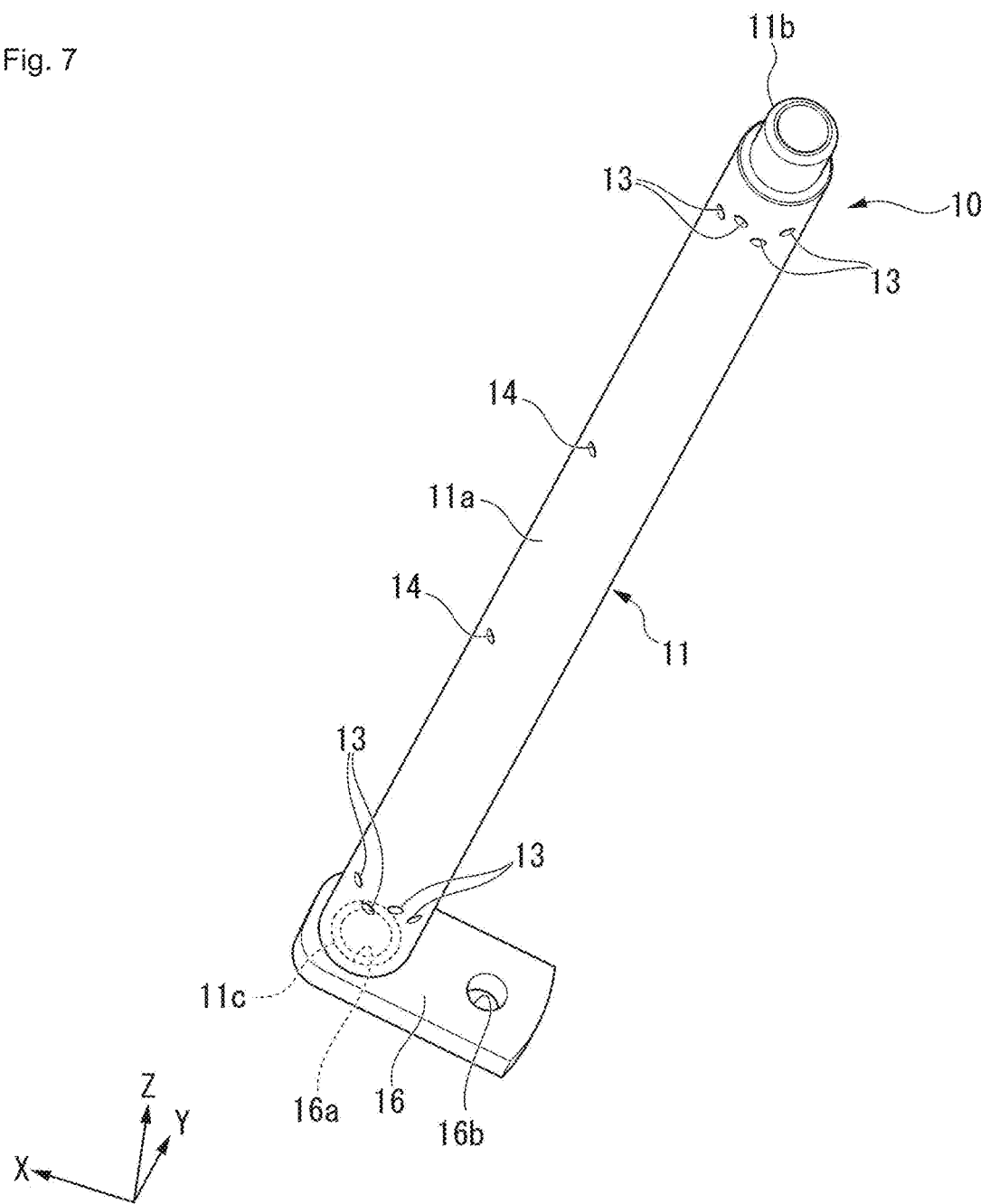
FIG. 7 is a perspective view showing the first refrigerant injection portion of the first preferred embodiment.

Referring to FIG. 7, the first refrigerant injection portion 11 includes a first pipe body portion 11a, a decreased diameter portion 11b defined at an end portion of the first pipe body portion 11a on the left side (i.e., the +y side), and a decreased diameter portion 11c defined at an end portion of the first pipe body portion 11a on the right side (i.e., the −y side).

The decreased diameter portion 11b is an end portion of the first refrigerant injection portion 11 on the left side (i.e., the +y side). The decreased diameter portion 11c is an end portion of the first refrigerant injection portion 11 on the right side (i.e., the −y side). Each of the decreased diameter portions 11b and 11c is arranged to have an outside diameter smaller than that of the first pipe body portion 11a. The first refrigerant injection portion 11 is fixed to the partition 61c with the decreased diameter portion 11b being inserted into the partition 61c from the right side. The decreased diameter portion 11b is arranged to open to the left side. Referring to FIG. 6, the decreased diameter portion 11b is arranged to open into the connection portion 94e of the first branch portion 94c. As a result, the first refrigerant injection portion 11 is joined to the fourth flow passage 94.

Referring to FIG. 7, a fitting member 16 is arranged at an end portion of the first refrigerant injection portion 11 on the right side (i.e., the −y side). The fitting member 16 is in the shape of a rectangular plate, having principal surfaces facing in the axial direction. The fitting member 16 includes a recessed portion 16a recessed to the right side from a surface thereof on the left side (i.e., the +y side). The right end portion of the first refrigerant injection portion 11, i.e., the decreased diameter portion 11c, is fitted and fixed in the recessed portion 16a. The right end portion of the first refrigerant injection portion 11 is closed by the fitting member 16.

The fitting member 16 includes a hole portion 16b arranged to pass through the fitting member 16 in the axial direction. Referring to FIG. 4, a bolt 18 is arranged to pass through the hole portion 16b from the right side (i.e., the −y side). The bolt 18 is arranged to pass through the hole portion 16b, and is screwed into the first support portion 63 illustrated in FIG. 2 from the right side. As the bolt 18 is screwed into the first support portion 63, the fitting member 16 is fixed to the first support portion 63. As a result, the right end portion of the first refrigerant injection portion 11 is thus fixed to the motor housing portion 61 through the fitting member 16.

Referring to FIG. 7, the first refrigerant injection portion 11 has a feed opening 13 and a first injection port 14. The feed opening 13 and the first injection port 14 are provided on an outer surface of the first refrigerant injection portion 11. The feed opening 13 and the first injection port 14 are, for example, circular. The oil O that has flowed into the first refrigerant injection portion 11 is discharged through the feed opening 13 and the first injection port 14. The feed opening 13 and the first injection port 14 are opening portions that are open to an outer circumferential surface of the first refrigerant injection portion 11 out of an opening portion of a hole that penetrates through a wall portion of the first refrigerant injection portion 11 from an inner peripheral surface to the outer circumferential surface. Specifically, referring to FIG. 5, the first injection port 14 is the opening portion that is open to the outer circumferential surface of the first refrigerant injection portion 11 out of an opening portion of a hole 11d that penetrates through a wall portion of the first refrigerant injection portion 11 from the inner peripheral surface to the outer circumferential surface.

Referring to FIG. 7, two or more feed openings 13 are defined in each of both axial end portions of the first pipe body portion 11a in the present preferred embodiment. For example, four feed openings 13 are defined in each of both axial end portions of the first pipe body portion 11a. The four feed openings 13 defined in the end portion of the first pipe body portion 11a on the right side (i.e., the −y side) are arranged in zigzag along the circumferential direction. The four feed openings 13 defined in the end portion of the first pipe body portion 11a on the right side include one feed opening 13 arranged to open downward directly in the vertical direction, two feed openings 13 each of which is arranged to open obliquely downward and forward, and one feed opening 13 arranged to open obliquely downward and rearward. The four feed openings 13 defined in the end portion of the first pipe body portion 11a on the left side (i.e., the +y side) are arranged in the same manner as the four feed openings 13 defined in the end portion of the first pipe body portion 11a on the right side except in axial position.

Referring to FIG. 4, among the plurality of feed openings 13, the four feed openings 13 defined on the right side (i.e., the −y side) are located on the upper side of the coil end 33a. Among the plurality of feed openings 13, the four feed openings 13 defined on the left side (i.e., the +y side) are located on the upper side of the coil end 33b. Therefore, the oil O which has been discharged through the feed opening 13 is fed to the coil ends 33a and 33b from the upper side. In this manner, the feed opening 13 feeds the oil O to the coil ends 33a and 33b. Therefore, the coil ends 33a and 33b can be cooled.

In particular, in the present preferred embodiment, the first refrigerant injection portion 11 is located on the upper side of the stator 30, and thus, the oil O from the feed openings 13 can be fed to the coil ends 33a and 33b from the upper side. As a result, the oil O from the feed openings 13 is allowed to flow downward from the upper side of the coil ends 33a and 33b by gravity. Accordingly, the oil O can be easily fed to the whole coil ends 33a and 33b to easily cool the whole coil ends 33a and 33b.

In addition, according to the present preferred embodiment, the plurality of feed openings 13 of the first refrigerant injection portion 11 are arranged above each of the coil ends 33a and 33b. This leads to an increase in the amount of the oil O fed from the first refrigerant injection portion 11 to each of the coil ends 33a and 33b. This contributes to appropriately cooling the coils 31, each of which is a heat-radiating component, and more appropriately cooling the stator 30.

According to the present preferred embodiment, the plurality of feed openings 13 located on the upper side of each of the coil ends 33a and 33b are arranged in zigzag along the circumferential direction. Therefore, axial positions of the plurality of feed openings 13 arranged along the circumferential direction are displaced alternately. Thus, the oil O can be more easily fed to the whole coil ends 33a and 33b than in the case where the plurality of feed openings 13 located on the upper side of each of the coil ends 33a and 33b are arranged at the same axial position.

According to the present preferred embodiment, the feed openings 13 located on the upper side of each of the coil ends 33a and 33b include the feed openings 13 arranged to face obliquely downward and forward, and the feed openings 13 arranged to face obliquely downward and rearward. Therefore, the oil O fed from the plurality of feed openings 13 can be easily fed to both a forward portion and a rearward portion of each of the coil ends 33a and 33b to easily feed the oil O to the whole coil ends 33a and 33b. This contributes to more appropriately cooling the coil ends 33a and 33b, and more appropriately cooling the stator 30.

The first injection port 14 is an injection port to inject the oil O into the stator core 32. That is, the injection port of the first refrigerant injection portion 11 includes the first injection port 14. The first injection port 14 is provided in a portion of the first refrigerant injection portion 11 that overlaps with the stator core 32 as viewed from the outside in the radial direction. In the present preferred embodiment, the two first injection ports 14 are provided in the first pipe body portion 11a with an interval in the axial direction. The two first injection ports 14 are located between the plurality of feed openings 13 provided at one axial end portion of the first pipe body portion 11a and the plurality of feed openings 13 provided at the other axial end portion of the first pipe body portion 11a in the axial direction.

Referring to FIG. 5, the first injection port 14 is located on the other circumferential side of the upper fixing portion 32f. That is, the upper fixing portion 32f is located on the one circumferential side of the first injection port 14. The first injection ports 14 are arranged to oppose each other with an interval on the rearward side of the upper fixing portion 32f. The first injection port 14 is located on the other circumferential side (i.e., the −θ side) with respect to the vertex VP of the stator core body 32a. The first injection port 14 is located below the upper end portion of the upper fixing portion 32f.

A direction D1 in which the first injection port 14 is open is a direction angled to the one circumferential side (i.e., the +θ side) with respect to a direction facing the directly lower side in the vertical direction. In the present preferred embodiment, the injection port of the first refrigerant injection portion 11 among the injection ports, configured to inject oil O to the stator core 32, includes only the first injection port 14 that is open in the direction angled to the one circumferential side with respect to the direction facing the directly lower side in the vertical direction.

The direction D1 in which the first injection port 14 is open is, for example, the direction angled to the one circumferential side with respect to a direction facing the motor axis J1. The direction facing the motor axis J1 is the radially inward direction. The direction in which the first refrigerant injection portion 11 faces the motor axis J1 includes, for example, a direction facing the radially inner side along an imaginary line IL3. The imaginary line IL3 is an imaginary line that extends in the radial direction passing through the motor axis J1 and a center point CP of the first refrigerant injection portion 11 as viewed in the axial direction. The center point CP is a point located at the center of the cylindrical first refrigerant injection portion 11 as viewed in the axial direction.

The direction D1 in which the first injection port 14 is open is a direction facing a portion of the outer circumferential surface of the stator core body 32a that is located on the other circumferential side (i.e., the −θ side) of the upper fixing portion 32f with respect to the boundary BP with the end portion of the upper fixing portion 32f on the other circumferential side (i.e., the −θ side).

Here, as viewed in the axial direction, a point where the imaginary line IL2 passing through the first injection port 14 and the motor axis J1 intersects with the outer circumferential surface of the stator core body 32a is defined as an intersection point IP. The intersection point IP is a portion located radially inside the first injection port 14. The imaginary line IL2 passes through the center of the first injection port 14 and the motor axis J1 and extends in the radial direction as viewed in the axial direction. In the present preferred embodiment, the direction D1 in which the first injection port 14 is open is a direction facing a region Rg located between the boundary BP and the intersection point IP on the outer circumferential surface of the stator core body 32a. The region Rg is a portion of the outer circumferential surface of the stator core body 32a between the boundary BP and a portion located radially inside the first injection port 14. The region Rg is located on the lower side toward the other circumferential side (i.e., the −θ side). In the present preferred embodiment, a projection area Pa, obtained by projecting the first injection port 14 onto the outer circumferential surface of the stator core body 32a along the direction D1, is entirely located in the region Rg.

Note that a "direction in which an injection port is open" in the present specification includes a direction that passes through a center of the injection port and extends along a normal line perpendicular to the center of the injection port. For example, the two-dot chain line indicated as the direction D1 in FIG. 5 is a normal line that passes through the center of the first injection port 14 and is perpendicular to the center of the first injection port 14.

Figure 8:
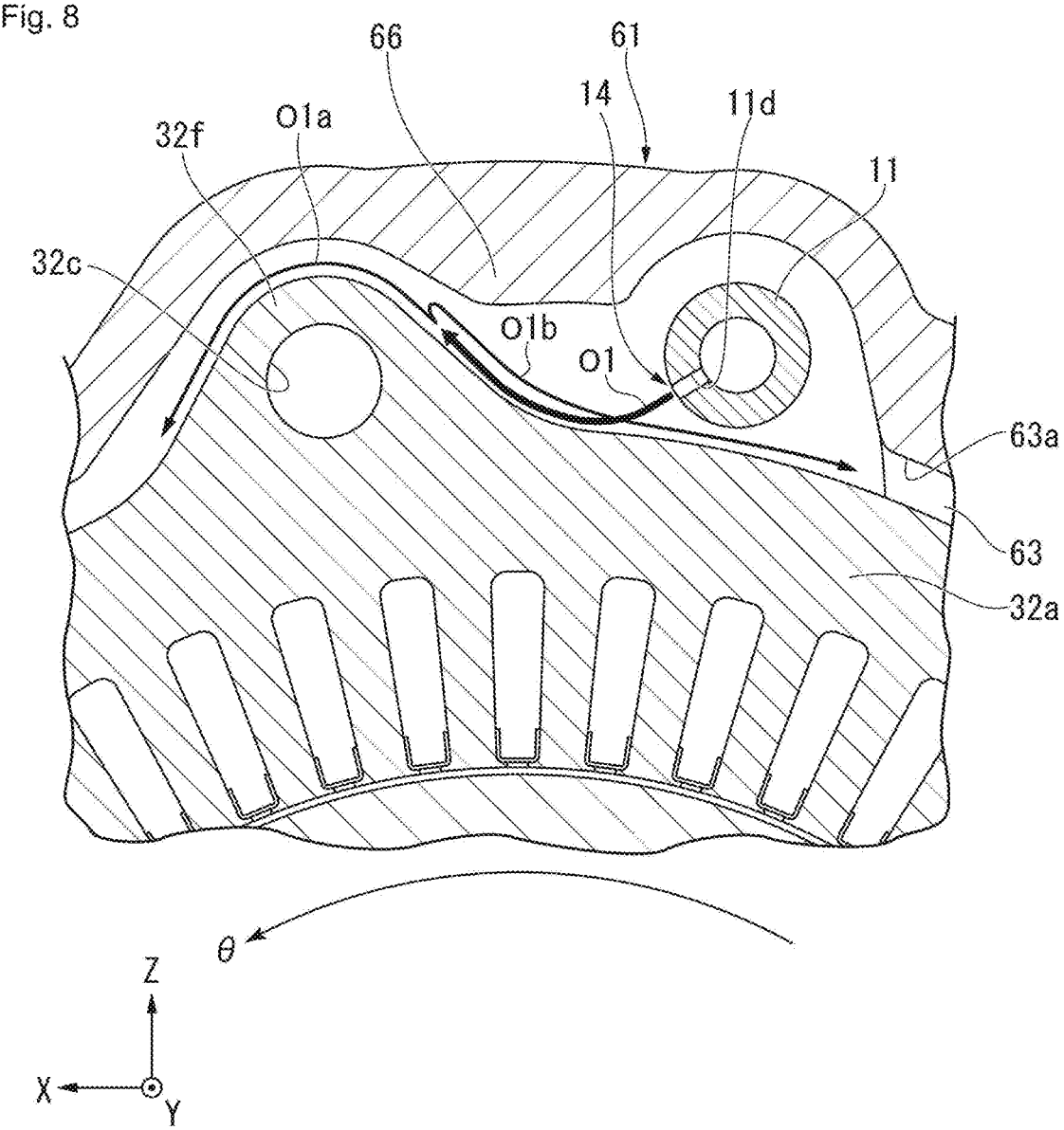
FIG. 8 is a sectional view showing a part of the stator core and the first refrigerant injection portion according to the first preferred embodiment, and is a view showing an example of flow of oil injected through a first injection port.

According to the present preferred embodiment, the direction D1 in which the first injection port 14 is open is the direction that is angled to the one circumferential side with respect to the direction facing the directly lower side in the vertical direction, and is the direction located on the other circumferential side of the boundary BP with the end portion of the upper fixing portion 32f on the other circumferential side on the outer circumferential surface of the stator core body 32a. Since the first injection port 14 is open in the direction angled to the one circumferential side with respect to the direction facing the directly lower side in the vertical direction, the oil O1 injected through the first injection port 14 can easily flow to the one circumferential side along the outer circumferential surface of the stator core 32 as shown in FIG. 8. Therefore, the oil O1 injected through the first injection port 14 can easily flow over the upper fixing portion 32f located on the one circumferential side of the first injection port 14.

On the other hand, the first injection port 14 is open toward the portion of the outer circumferential surface of the stator core body 32a located on the other circumferential side with respect to the boundary BP. Therefore, it is possible to cause the oil O1 injected through the first injection port 14 to hardly flow over the upper fixing portion 32f as compared to a case where the first injection port 14 is open toward the upper fixing portion 32f. In addition, the first injection port 14 is located below the upper end portion of the upper fixing portion 32f, it is possible to cause the oil O1 injected through the first injection port 14 to hardly flow over the upper fixing portion 32f.

When the position of the first injection port 14 and the direction D1 in which the first injection port 14 is open are determined with respect to the upper fixing portion 32f as described above, it is possible to suppress the entire oil O1 injected through the first injection port 14 from flowing over the upper fixing portion 32f and also possible to suppress that the oil O1 injected through the first injection port 14 does not entirely flow over the upper fixing portion 32f. As a result, the oil O1 injected through the first injection port 14 can be easily divided into oil O1a that flows over the upper fixing portion 32f and oil O1b that does not flow over the upper fixing portion 32f.

The oil O1a that flows over the upper fixing portion 32f flows over the upper fixing portion 32f to the one circumferential side and flows forward and downward along the outer circumferential surface of the forward portion of the stator core body 32a. A flow direction of the oil O1b that does not flow over the upper fixing portion 32f is reversed in the middle of a surface of the upper fixing portion 32f on the other circumferential side, that is, becomes a direction to the other circumferential side, and the oil flows rearward and downward along an outer circumferential surface of a rearward portion of the stator core body 32a. As a result, it is possible to make the oil O suitably flow from an upward portion of the stator core 32 to both the circumferential sides along the outer circumferential surface of the stator core body 32a. Therefore, the first refrigerant injection portion 11 can easily feed the oil O to the entire stator core 32, and the cooling efficiency of the stator core 32 can be improved.

Figure 9:
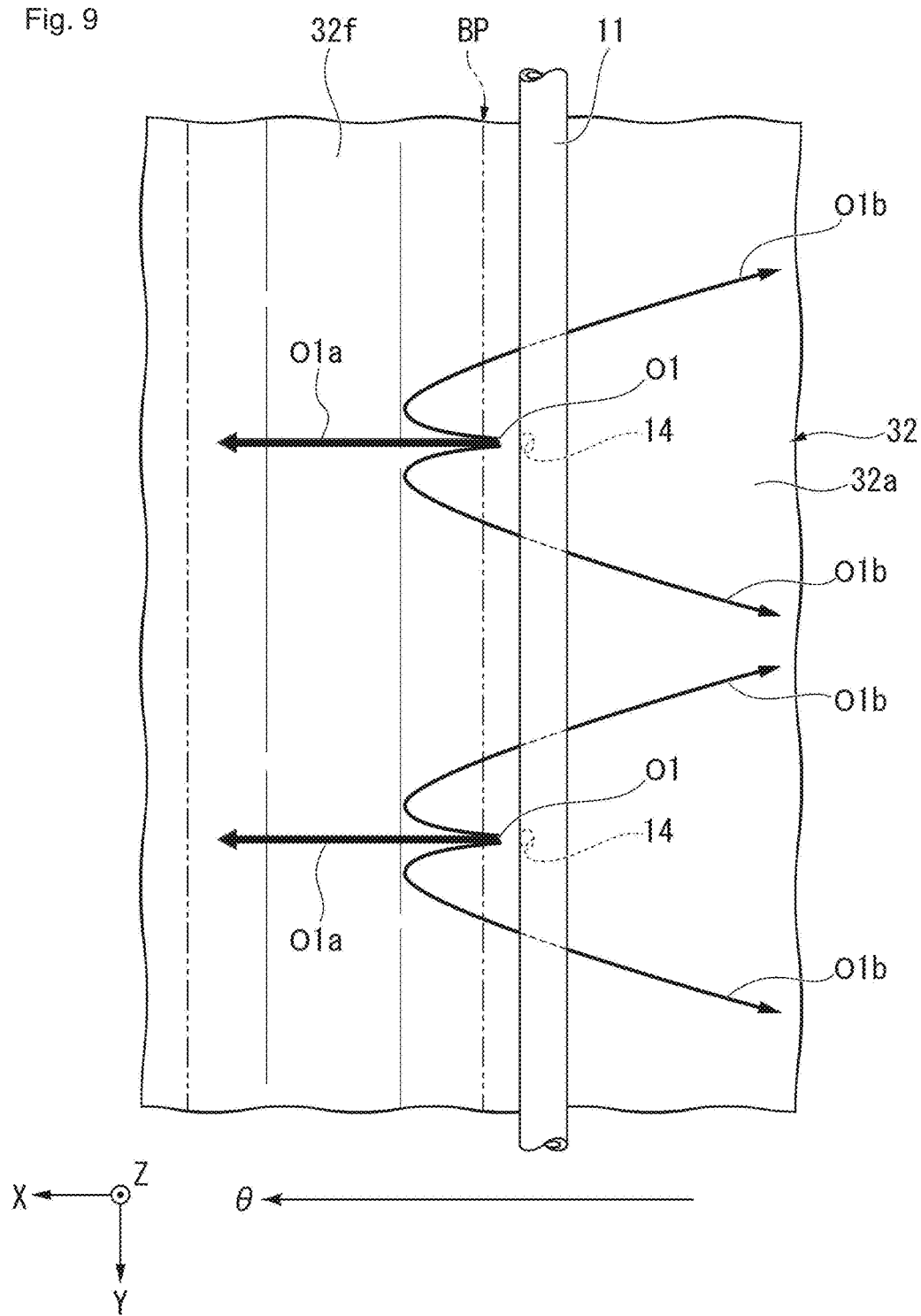
FIG. 9 is a view of a part of the stator core and the first refrigerant injection portion according to the first preferred embodiment as viewed from above, and is a view showing an example of flow of oil injected through the first injection port.

Referring to FIG. 9, the oil O1b that does not flow over the upper fixing portion 32f divides into the oil O1b flowing to the right side (i.e., the +y side) of the first injection port 14 and the oil O1b flowing to the left side (i.e., the −y side) of the first injection port 14, for example, when folded back to the other circumferential side in the middle of the surface on the other circumferential side of the upper fixing portion 32f.

In addition, according to the present preferred embodiment, the direction D1 in which the first injection port 14 is open is the direction angled to the one circumferential side with respect to the direction facing the motor axis J1. Therefore, the oil O1 injected through the first injection port 14 can be caused to more easily flow to the one circumferential side along the outer circumferential surface of the stator core 32. As a result, the amount of the oil O1a that flows over the upper fixing portion 32f can be increased.

In addition, according to the present preferred embodiment, the radial distance L2 between the upper fixing portion 32f and the inner peripheral surface of the motor housing portion 61 is at least partially smaller than the radial distance L1 between the boundary BP and the inner peripheral surface of the motor housing portion 61. Therefore, a gap between the upper fixing portion 32f and the inner peripheral surface of the motor housing portion 61 becomes relatively narrow. As a result, it is possible to limit the amount of the oil O1a that can flow over the upper fixing portion 32f through the gap between the upper fixing portion 32f and the inner peripheral surface of the motor housing portion 61. Therefore, it is possible to suppress the amount of the oil O1a that flows over the upper fixing portion 32f from being excessively increased. On the other hand, the oil O1 that has failed to pass through the gap between the upper fixing portion 32f and the inner peripheral surface of the motor housing portion 61 does not flow over the upper fixing portion 32f and becomes the oil O1b that flows to the other circumferential side. As a result, the amount of the oil O1b that does not flow over the upper fixing portion 32f can be increased. Therefore, it is easy to equalize the amount of the oil O flowing from the upward portion of the stator core 32 to both the circumferential sides.

In addition, according to the present preferred embodiment, the surface of the upper fixing portion 32f on the other circumferential side is located on the lower side toward the other circumferential side. Therefore, it is possible to make the oil O1b that does not flow over the upper fixing portion 32f to easily flow to the other circumferential side along the surface of the upper fixing portion 32f on the other circumferential side. As a result, it is possible to suppress the oil O1b that does not flow over the upper fixing portion 32f from accumulating in the upward portion of the stator core 32, and to suitably feed the oil O1b to the outer circumferential surface on the rearward side of the stator core body 32a. Therefore, the cooling efficiency of the stator core 32 can be further improved.

In addition, according to the present preferred embodiment, the portion between the boundary BP and the portion located radially inside the first injection port 14, that is, the intersection point IP in the outer circumferential surface of the stator core body 32a is located on the lower side toward the other circumferential side. Therefore, the oil O1b, which has flowed to the other circumferential side along the surface of the upper fixing portion 32f on the other circumferential side and flowed to the outer circumferential surface of the stator core body 32a, can be caused to flow to the other circumferential side along the outer circumferential surface of the stator core body 32a by gravity. As a result, it is possible to further suppress the oil O1b from accumulating in the upward portion of the stator core 32, and to further suitably feed the oil O1b to the outer circumferential surface on the rearward side of the stator core body 32a. Therefore, the cooling efficiency of the stator core 32 can be further improved.

In addition, the surface of the upper fixing portion 32f on the other circumferential side is the curved surface and is smoothly joined to the outer circumferential surface of the stator core body 32a at the boundary BP according to the present preferred embodiment. Therefore, the oil O1b flowing while being changed in direction toward the other circumferential side in the middle of the surface of the upper fixing portion 32f on the other circumferential side can be caused to smoothly flow from the surface of the upper fixing portion 32f on the other circumferential side to the outer circumferential surface of the stator core body 32a. As a result, it is possible to make the oil O1b that does not flow over the upper fixing portion 32f easily flow to the other circumferential side. Therefore, the cooling efficiency of the stator core 32 can be further improved.

In the present preferred embodiment, a surface on which the oil O1b flows until reaching the portion located on the other circumferential side with respect to the first refrigerant injection portion 11 in the outer circumferential surface of the stator core body 32a from the surface of the upper fixing portion 32f on the other circumferential side toward the other circumferential side is a curved surface that smoothly extends toward the other circumferential side, and is located on the lower side toward the other circumferential side. Therefore, the oil O1b changed in direction toward the other circumferential side on the surface of the upper fixing portion 32f on the other circumferential side can be caused to suitably flow to the other circumferential side by gravity.

In addition, according to the present preferred embodiment, the upper end portion of the upper fixing portion 32f is located on the one circumferential side with respect to the upper vertex VP of the stator core body 32a, and the first injection port 14 is located on the other circumferential side with respect to the vertex VP. Therefore, it is easy to adopt the configuration in which the surface on which the oil O1b flows until reaching the portion located on the other circumferential side with respect to the first refrigerant injection portion 11 in the outer circumferential surface of the stator core body 32a from the surface of the upper fixing portion 32f on the other circumferential side toward the other circumferential side is configured as the surface located on the lower side toward the other circumferential side as in the present preferred embodiment.

In addition, according to the present preferred embodiment, the first support portion 63 located on the other circumferential side of the first refrigerant injection portion 11 has the first through groove 63a penetrating through the first support portion 63 in the circumferential direction. Therefore, the oil O1b that has flowed to the other circumferential side with respect to the first refrigerant injection portion 11 can be caused to flow to the other circumferential side with respect to the first support portion 63 through the first through groove 63a. As a result, it is possible to cause the oil O1b to more easily flow to the other circumferential side, and to easily feed the oil O to the entire circumference of the stator core 32. Therefore, the cooling efficiency of the stator core 32 can be further improved. In addition, the outer circumferential surface of the stator core body 32a can be supported by the first support portion 63, and thus, it is possible to suppress the vibration of the stator core 32.

In addition, the first refrigerant injection portion 11 is the pipe according to the present preferred embodiment. Therefore, the first refrigerant injection portion 11 can be easily created, for example, as compared to a case where a hole is provided in a wall portion of the housing 6 to make the first refrigerant injection portion 11. In addition, it is also easy to remove the first refrigerant injection portion 11 from the housing 6 and perform replacement.

In addition, according to the present preferred embodiment, the injection port of the first refrigerant injection portion 11 among the injection ports, configured to inject the refrigerant to the stator core 32, includes only the first injection port 14 that is open in the direction angled to the one circumferential side with respect to the direction facing the directly lower side in the vertical direction. Therefore, it is easy to reduce the number of openings provided in the first refrigerant injection portion 11 for example, as compared to a case where the first refrigerant injection portion 11 is provided with injection ports that are open in the direction angled to the other circumferential side with respect to the direction facing the directly lower side in the vertical direction. As a result, it is possible to suppress a decrease in pressure of the oil O in the first refrigerant injection portion 11. Therefore, it is possible to suppress a decrease in momentum of the oil O1 injected through the first injection port 14 of the first refrigerant injection portion 11. Therefore, it is possible to facilitate a part of the oil O1 injected through the first injection port 14 to suitably flow over the upper fixing portion 32f.

Referring to FIGS. 2 and 4, the second refrigerant injection portion 12 is located on the forward side (i.e., the +x side) of the stator 30. The second refrigerant injection portion 12 is located on the lower side and the forward side of the first refrigerant injection portion 11. In the present preferred embodiment, the radial position of the second refrigerant injection portion 12 is the same as the radial position of the fixing portion 32b. The second refrigerant injection portion 12 is located on the upper side of the front fixing portion 32h. The second refrigerant injection portion 12 is located on the one circumferential side of the first refrigerant injection portion 11. The upper fixing portion 32f is located between the first refrigerant injection portion 11 and the second refrigerant injection portion 12 in the circumferential direction. That is, the first refrigerant injection portion 11 and the second refrigerant injection portion 12 are arranged so as to sandwich the fixing portion 32b in the circumferential direction.

Referring to FIG. 4, the second refrigerant injection portion 12 includes a second pipe body portion 12a and a decreased diameter portion 12b defined at an end portion of the second pipe body portion 12a on the left side (i.e., the +y side). Although not illustrated in the drawings, similarly to the first refrigerant injection portion 11, the second refrigerant injection portion 12 includes a decreased diameter portion defined at an end portion of the second pipe body portion 12a on the right side (i.e., the −y side).

The decreased diameter portion 12b is an end portion of the second refrigerant injection portion 12 on the left side (i.e., the +y side). The decreased diameter portion 12b is arranged to have an outside diameter smaller than that of the second pipe body portion 12a. The second refrigerant injection portion 12 is fixed to the partition 61c with the decreased diameter portion 12b being inserted into the partition 61c from the right side (i.e., the −y side). The decreased diameter portion 12b is arranged to open to the left side. Referring to FIG. 6, the decreased diameter portion 12b is arranged to open into the end portion of the second branch portion 94f on the forward side (i.e., the +x side). As a result, the second refrigerant injection portion 12 is joined to the fourth flow passage 94. Therefore, the first refrigerant injection portion 11 and the second refrigerant injection portion 12 are joined to each other via the fourth flow passage 94. In more detail, the first refrigerant injection portion 11 and the second refrigerant injection portion 12 are joined to each other through the first branch portion 94c, the connection portion 94b, and the second branch portion 94f.

Referring to FIG. 4, a fitting member 17 is arranged at an end portion of the second refrigerant injection portion 12 on the right side (i.e., the −y side). The fitting member 17 is in the shape of a rectangular plate, having principal surfaces facing in the axial direction. A right end portion of the second refrigerant injection portion 12 is fixed to the fitting member 17 similarly to the first refrigerant injection portion 11. The right end portion of the second refrigerant injection portion 12 is closed by the fitting member 17. Although not illustrated in the drawings, the fitting member 17 is fixed to a projecting portion 61e illustrated in FIG. 2 through a bolt. As a result, the right end portion of the second refrigerant injection portion 12 is thus fixed to the motor housing portion 61 through the fitting member 17. The projecting portion 61e is arranged to project radially inward in the inner peripheral surface of the motor housing portion 61.

Referring to FIG. 4, the second refrigerant injection portion 12 has a second injection port 15. The second injection port 15 is an injection port to inject the oil O into the stator core 32. That is, the injection port of the second refrigerant injection portion 12 includes the second injection port 15. The second injection port 15 is provided on an outer surface of the second refrigerant injection portion 12. The second injection port 15 is, for example, circular. The oil O that has flowed into the second refrigerant injection portion 12 is discharged through the second injection port 15. Referring to FIG. 2, the second injection port 15 is the opening portion that is open to the outer circumferential surface of the second refrigerant injection portion 12 out of an opening portion of a hole 12d that penetrates through a wall portion of the second refrigerant injection portion 12 from the inner peripheral surface to the outer circumferential surface.

Referring to FIG. 4, the second injection port 15 is provided in a portion of the second refrigerant injection portion 12 that overlaps with the stator core 32 as viewed from the outside in the radial direction. In the present preferred embodiment, the six second injection ports 15 are provided in the second pipe body portion 12a at intervals in the axial direction. Referring to FIG. 2, the second injection port 15 is located on the one circumferential side of the upper fixing portion 32f. The second injection port 15 is located on the forward side (i.e., the +x side) of the stator core 32. In the present preferred embodiment, the second injection port 15 is located below the upper end portion of the stator core 32. In the present preferred embodiment, the upper end portion of the stator core 32 is, for example, the upper end portion of the upper fixing portion 32f. In the present preferred embodiment, the second injection port 15 is located below the upper end portion of the stator core body 32a and above the motor axis J1.

The second injection port 15 is open to the other circumferential side at a position on the one circumferential side of the upper fixing portion 32f. Note that, in the present specification, it suffices that "an injection port is open to a certain side" is a state where a direction in which the injection port is open includes a component facing the certain side. That is, it suffices that the state where "the second injection port 15 is open to the other circumferential side" is a state where the direction in which the second injection port 15 is open includes a component facing the other circumferential side, and the second injection port 15 may be open in a direction perpendicular to the radial direction or may be open to be angled with respect to the direction perpendicular to the radial direction. The second injection port 15 is open to be angled radially inward with respect to the direction perpendicular to the radial direction. The second injection port 15 is open, for example, obliquely upward and rearward.

The second support portion 64 is located between the upper fixing portion 32f and the second refrigerant injection portion 12 in the circumferential direction. The second injection port 15 is open toward the second through groove 64a provided in the second support portion 64, for example. The oil O2 injected through the second injection port 15 is ejected obliquely upward and rearward and passes through the second through groove 64a to reach the outer circumferential surface of the upward portion of the stator core 32. The oil O2 injected through the second refrigerant injection portion 12 may reach the upper fixing portion 32f or does not necessarily reach the upper fixing portion 32f. The oil O2 that has reached the outer circumferential surface of the upward portion of the stator core 32 is blocked by, for example, the upper fixing portion 32f, and flows on the outer circumferential surface of the stator core body 32a in a direction substantially opposite to the injected direction. As described above, the forward portion of the stator core 32 can be cooled by the oil O2 injected through the second injection port 15. Therefore, the stator core 32 can be cooled more appropriately by providing the second injection port 15.

In addition, the support portion 65 includes the second support portion 64 located between the upper fixing portion 32f and the second refrigerant injection portion 12 in the circumferential direction according to the present preferred embodiment. Therefore, there is a possibility that the oil O1a, which has been injected through the first injection port 14 and flowed over the upper fixing portion 32f, is blocked by the second support portion 64 and hardly flows to the one circumferential side with respect to the second support portion 64. Even in this case, the oil O2 can be fed to the outer circumferential surface of the stator core body 32a located on the one circumferential side with respect to the second support portion 64 by injecting the oil O2 through the second injection port 15 of the second refrigerant injection portion 12.

In addition, the second support portion 64 includes the second through groove 64a penetrating through the second support portion 64 in the circumferential direction according to the present preferred embodiment. Therefore, the oil O1a, which has been injected through the first injection port 14 and flowed over the upper fixing portion 32f, can be caused to flow to the one circumferential side with respect to the second support portion 64 through the second through groove 64a. In addition, the oil O2 injected through the second injection port 15 can also be sent to the other circumferential side with respect to the second support portion 64 through the second through groove 64a as described above. As a result, the oil O injected through the first injection port 14 and the second injection port 15 can be fed to the outer circumferential surface of the stator core 32 over a wider range. Therefore, the cooling efficiency of the stator core 32 can be further improved.

In addition, the second refrigerant injection portion 12 is the pipe according to the present preferred embodiment. Therefore, the second refrigerant injection portion 12 can be easily created, for example, as compared to a case where a hole is provided in a wall portion of the housing 6 to make the second refrigerant injection portion 12. In addition, it is also easy to remove the second refrigerant injection portion 12 from the housing 6 and perform replacement.

The oil pump 96 illustrated in FIG. 1 is a pump to send the oil O as the coolant. In the present preferred embodiment, the oil pump 96 is an electric pump driven by electricity. The oil pump 96 is arranged to suck the oil O from the oil pool P through the first flow passage 92a, and to feed the oil O to the motor 2 through the second flow passage 92b, the cooler 97, the third flow passage 92c, the fourth flow passage 94, and the refrigerant injection portion 10. That is, the oil pump 96 is arranged to send the oil O housed in the interior of the housing 6 to the fourth flow passage 94, the first refrigerant injection portion 11, and the second refrigerant injection portion 12. Therefore, the oil O can be easily sent to the first refrigerant injection portion 11 and the second refrigerant injection portion 12.

A portion of the oil O which has been sent to the third flow passage 92c through the oil pump 96 flows into the fourth flow passage 94 through the inflow portion 94a. Referring to FIG. 6, after flowing into the inflow portion 94a, the oil O flows to the rearward side (i.e., the −x side), and divides into two portions, one flowing into the first branch portion 94c and the other flowing into the second branch portion 94f. The oil O which has flowed into the first branch portion 94c flows into the first refrigerant injection portion 11 through the end portion of the first refrigerant injection portion 11 on the left side (i.e., the +y side). The oil O which has flowed into the first refrigerant injection portion 11 flows to the right side (i.e., the −y side) inside the first refrigerant injection portion 11 and is fed to the stator 30 through the feed opening 13 and the first injection port 14. On the other hand, the oil O which has flowed into the second branch portion 94f flows into the second refrigerant injection portion 12 through the left end portion of the second refrigerant injection portion 12. The oil O which has flowed into the second refrigerant injection portion 12 flows to the right side inside the second refrigerant injection portion 12 and is fed to the stator 30 through the second injection port 15.

In this manner, the oil O can be fed to the stator 30 through each of the first refrigerant injection portion 11 and the second refrigerant injection portion 12 to cool the stator 30. In addition, the oil O that has flowed into the inflow portion 94a can be divided into two portions, one flowing into the first branch portion 94c to be fed to the first refrigerant injection portion 11, and the other flowing into the second branch portion 94f to be fed to the second refrigerant injection portion 12. Therefore, it is easy to suppress generation of a deviation between the amount of the oil O fed to the first refrigerant injection portion 11 and the amount of the oil O fed to the second refrigerant injection portion 12 as compared to a case where the oil O flows from one refrigerant injection portion 10 between the first refrigerant injection portion 11 and the second refrigerant injection portion 12 to the other refrigerant injection portion 10. In addition, a channel along which the oil O is fed to each of the refrigerant injection portions 10 can be easily shortened to make it easier to keep the temperature of the oil O to be fed to the stator 30 relatively low. This makes it easier to appropriately cool the stator 30.

The portion of the oil O which has been fed from each of the first refrigerant injection portion 11 and the second refrigerant injection portion 12 to the stator 30 drips downward, and is accumulated in the lower region in the interior of the motor housing portion 61. The oil O gathered in the lower region in the interior of the motor housing portion 61 travels to the oil pool P in the gear housing portion 62 through the partition opening 68 defined in the partition 61c. In the above-described manner, the second oil passage 92 feeds the oil O to the stator 30.

The cooler 97 illustrated in FIG. 1 is arranged to cool the oil O passing through the second oil passage 92. The second flow passage 92b and the third flow passage 92c are connected to the cooler 97. The second flow passage 92b and the third flow passage 92c are joined to each other through an internal flow passage of the cooler 97. A cooling water pipe 98, in which cooling water cooled by a radiator (not shown) is caused to pass, is connected to the cooler 97. A portion of the oil O which passes through an interior of the cooler 97 is cooled through heat exchange with the cooling water passing through the cooling water pipe 98.

According to the present preferred embodiment, the first refrigerant injection portion 11 and the second refrigerant injection portion 12 are joined by the fourth flow passage 94. Therefore, the oil O can be fed to both the first refrigerant injection portion 11 and the second refrigerant injection portion 12 by arranging the oil O to be sent to the inflow portion 94a of the fourth flow passage 94 as in the present preferred embodiment, for example. That is, the number of oil passages defined in the housing 6 can be reduced as compared to a case where separate oil passages are provided to feed the oil O to the first refrigerant injection portion 11 and the second refrigerant injection portion 12. This contributes to preventing or reducing an increase in size of the housing 6.

The fourth flow passage 94 is defined in the partition 61c, which is located on the left side of the stator 30. This makes it possible to arrange the fourth flow passage 94 to overlap with the stator 30 when viewed in the axial direction. This makes it easier to arrange the fourth flow passage 94 such that an interference between the fourth flow passage 94 and each fixing portion 32b of the stator 30 is avoided. In addition, an increase in radial dimension of the housing 6 can be prevented or reduced compared to the case where, for example, the fourth flow passage 94 is arranged radially outside of the stator 30. In addition, since the fourth flow passage 94 is defined in the partition 61c of the housing 6, the drive apparatus 1 as a whole can be downsized more easily as compared to a case of providing a flow passage that joins the first refrigerant injection portion 11 and the second refrigerant injection portion 12 by a pipe or the like outside of the housing 6. Therefore, the present preferred embodiment is able to prevent or reduce an increase in the size of the drive apparatus 1.

According to the present preferred embodiment, the fourth flow passage 94 includes a portion arranged to pass radially inward of the fixing portions 32b. This makes it easier to arrange the fourth flow passage 94 to avoid an interference with each fixing portion 32b, and prevent or reduce an increase in the radial dimension of the housing 6. This in turn makes it easier to prevent or reduce an increase in the size of the drive apparatus 1.

In addition, according to the present preferred embodiment, the first refrigerant injection portion 11 and the second refrigerant injection portion 12 are arranged so as to sandwich the fixing portion 32b in the circumferential direction. Therefore, it is possible to arrange each of the first refrigerant injection portion 11 and the second refrigerant injection portion 12 to be radially closer to the stator core body 32a while arranging each of the first refrigerant injection portion 11 and the second refrigerant injection portion 12 not to interfere with the fixing portion 32b. Therefore, it is possible to easily feed the oil O to the stator 30 through each of the first refrigerant injection portion 11 and the second refrigerant injection portion 12, and to suppress an increase in radial dimension of the drive apparatus 1.

In addition, according to the present preferred embodiment, the first refrigerant injection portion 11 and the second refrigerant injection portion 12 extend in a straight line in the axial direction. Therefore, it is possible to suppress the increase in radial dimension of the drive apparatus 1 as compared to a case where, for example, each of the first refrigerant injection portion 11 and the second refrigerant injection portion 12 is arranged to curve in a radial direction. In addition, the shapes of the first refrigerant injection portion 11 and the second refrigerant injection portion 12 can be made simple, and thus, the first refrigerant injection portion 11 and the second refrigerant injection portion 12 can be easily created. In addition, the first refrigerant injection portion 11 and the second refrigerant injection portion 12 can be easily arranged to oppose the stator 30 over a wide range in the axial direction. Therefore, it is easy to feed the oil O from the first refrigerant injection portion 11 and the second refrigerant injection portion 12 to the wide range of the stator 30 in the axial direction. This in turn makes it possible to more appropriately cool the stator 30.

According to the present preferred embodiment, the motor axis J1 is arranged to extend in a horizontal direction perpendicular to the vertical direction. Therefore, feeding the oil O from the refrigerant injection portion 10 to the upper side of the stator 30 allows the oil O to flow downward from the upper side of the stator 30 by gravity. This makes it easier to easily feed the oil O to the whole stator 30, and cool the whole stator 30 with the oil O.

According to the present preferred embodiment, the end portion of the first refrigerant injection portion 11 on the right side is closed by the fitting member 16, while the end portion of the second refrigerant injection portion 12 on the right side is closed by the fitting member 17. In the present preferred embodiment, the right end portion of the first refrigerant injection portion 11 is the end portion on a side opposite to the side on which the oil O flows into the first refrigerant injection portion 11. The right end portion of the second refrigerant injection portion 12 is the end portion on a side opposite to the side on which the oil O flows into the second refrigerant injection portion 12. That is, an axial end portion of each pipe on the side opposite to the side on which the oil O flows into the pipe is closed. This makes it easier to increase a pressure of the oil O flowing in each pipe than in the case where the axial end portion of each pipe on the side opposite to the side on which the oil O flows into the pipe is open. This makes it easier to cause the oil O to be injected with great force through each oil feed opening of each pipe. This makes it easier to appropriately feed the oil O discharged through each oil feed opening to the stator 30.

In particular, the second injection port 15 faces upward in the second refrigerant injection portion 12 of the present preferred embodiment. Therefore, the oil O2 can be injected upward with great force from the second injection port 15. As a result, it is easy to cause the oil O2 discharged from the second injection port 15 to reach a higher portion of the stator core 32. This makes it easier to feed the oil O2 discharged from the second refrigerant injection portion 12 to the stator core 32 over a wide range to more appropriately cool the stator core 32.

Figure 10:
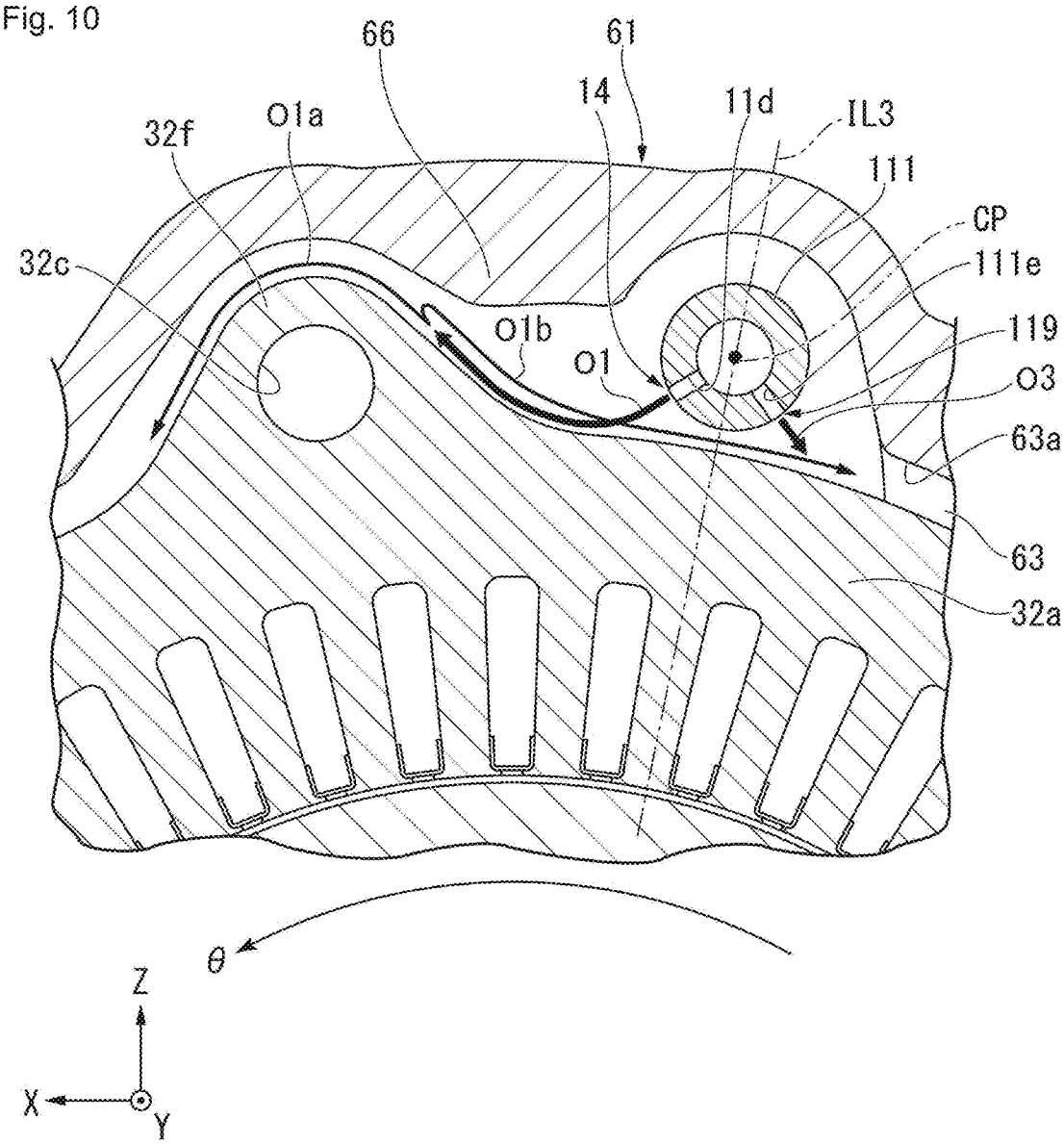
FIG. 10 is a sectional view showing a part of a stator core and a first refrigerant injection portion according to a second preferred embodiment.

Referring to FIG. 10, injection ports of a first refrigerant injection portion 111 of the present preferred embodiment include a third injection port 119. The third injection port 119 is, for example, an opening portion that is open to an outer circumferential surface of the first refrigerant injection portion 111 out of an opening portion of a hole 111*e* that penetrates through a wall portion of the first refrigerant injection portion 111 from an inner peripheral surface to the outer circumferential surface. The third injection port 119 is open to the other circumferential side. The third injection port 119 is open to a side opposite to the first injection port 14 in the circumferential direction. The third injection port 119 is open, for example, obliquely downward and rearward. A direction in which the third injection port 119 is open is a direction angled radially inward with respect to the direction perpendicular to the radial direction.

Although not illustrated, a plurality of the third injection ports 119 are provided at intervals in the axial direction in the present preferred embodiment. The number of the first injection ports 14 and the number of the third injection ports 119 are two, for example. An axial position of each of the third injection ports 119 is, for example, the same as the axial position of each of the first injection ports 14. The first injection port 14 and the third injection port 119 are arranged, for example, in line symmetry with respect to the imaginary line IL3 as viewed in the axial direction. An opening area of the first injection port 14 and an opening area of the third injection port 119 are, for example, the same as each other. Note that the opening area of the third injection port 119 may be larger than the opening area of the first injection port 14 or smaller than the opening area of the first injection port 14.

Oil O3 injected through the third injection port 119 is injected toward the other circumferential side. Therefore, the oil O can be more suitably fed to the portion of the stator core 32 located on the other circumferential side with respect to the first refrigerant injection portion 111. As a result, the stator core 32 can be cooled more appropriately. The other configurations of the first refrigerant injection portion 111 can be made the same as the other configurations of the first refrigerant injection portion 11 of the first preferred embodiment.

Figure 11:
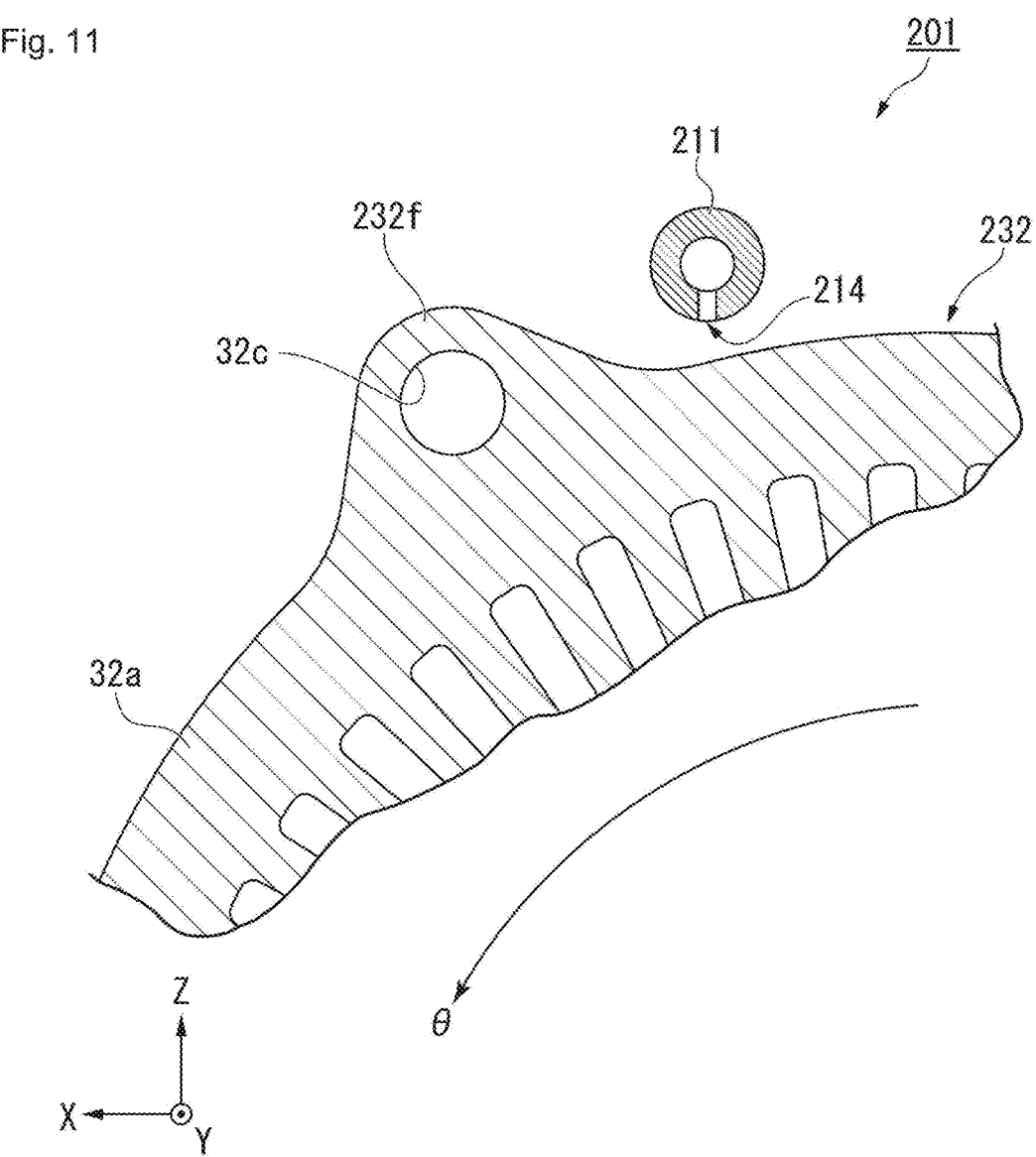
FIG. 11 is a sectional view showing a part of a stator core, a first refrigerant injection portion, and a third refrigerant injection portion according to a third preferred embodiment.

Referring to FIG. 11, in a stator core 232 of the present preferred embodiment, an upper fixing portion 232*f* is located on one circumferential side with respect to the upper fixing portion 32*f* of the first preferred embodiment described above. The upper fixing portion 232*f* is arranged to project obliquely upward and forward. A first refrigerant injection portion 211 is located on the other circumferential side of the upper fixing portion 232*f*. The first refrigerant injection portion 211 is located on the front side with respect to the motor axis J1. The first refrigerant injection portion 211 is located above the stator core body 32*a*. A direction in which a first injection port 214 of the first refrigerant injection portion 211 is open in the present preferred embodiment is a direction facing the directly lower side in the vertical direction and is a direction facing a portion located on the other circumferential side of a boundary with an end portion of the upper fixing portion 232*f* on the other circumferential side on the outer circumferential surface of the stator core body 32*a*. Therefore, the oil O injected through the first injection port 214 easily flows to the one circumferential side as compared to a case where the first injection port 214 is angled and open to the other circumferential side with respect to the directly lower side in the vertical direction. As a result, the oil O injected through the first injection port 214 is easily divided into oil O that flows over the upper fixing portion 232*f* and oil O that does not flow over the upper fixing portion 232*f* similarly to the above-described first preferred embodiment. As a result, the stator core 232 can be cooled appropriately. Therefore, the cooling efficiency of the stator core 232 can be improved.

The direction in which the first injection port 214 of the first refrigerant injection portion 211 is open is a direction angled to the one circumferential side with respect to the direction facing the motor axis J1. Therefore, it is easier to cause the oil O injected through the first injection port 214 to flow to the one circumferential side. The other configurations of the first refrigerant injection portion 211 can be made the same as the other configurations of the first refrigerant injection portion 11 of the first preferred embodiment. The other configurations of a drive apparatus 201 can be made the same as the other configurations of the drive apparatus 1 of the first preferred embodiment.

The present invention is not limited to the above-described preferred embodiment, and other structures may be adopted in other preferred embodiments of the present invention within the scope of the technical idea of the present invention. In the above-described preferred embodiment, the oil O is used as the coolant, but this is not essential to the present invention. Any other desirable coolant that is able to cool the stator by being fed to the stator may alternatively be used. For example, an insulating liquid or water may alternatively be used as the coolant. In the case where water is used as the coolant, an insulating process may be performed on an outer surface of the stator.

When the first refrigerant injection portion and the second refrigerant injection portion are pipes, each pipe may be a polygonal pipe. The first refrigerant injection portion and the second refrigerant injection portion are not necessarily pipes. The first refrigerant injection portion and the second refrigerant injection portion may be oil passages provided in the housing. The first refrigerant injection portion does not necessarily include the feed opening that feeds the refrigerant to the coil end. The second refrigerant injection portion is not necessarily provided. A plurality of the first injection ports may be provided at the same axial position. Only one first injection port may be provided. The orientation in the vertical direction is not particularly limited as long as the direction in which the first injection port is open is the direction that is angled to the one circumferential side with respect to the direction facing the motor axis, and is the direction facing a portion located on the other circumferential side of the boundary with the end portion of the upper fixing portion on the other circumferential side on the outer circumferential surface of the stator core body. The direction in which the first injection port is open may be, for example, the direction facing upward.

A shape of the fixing portion of the stator core is not particularly limited. The entire upper fixing portion may be located on the one circumferential side with respect to the vertex on the upper side of the stator core body, or may be located on the other circumferential side with respect to the vertex on the upper side of the stator core body. The radial distance between the upper fixing portion and the inner peripheral surface of the motor housing portion may be smaller than the radial distance between the boundary with the end portion of the upper fixing portion on the other circumferential side and the inner peripheral surface of the motor housing portion only in a portion. The radial distance between the upper fixing portion and the inner peripheral surface of the motor housing portion may be larger than the radial distance between the boundary with the end portion of the upper fixing portion on the other circumferential side and the inner peripheral surface of the motor housing portion.

The upper fixing portion may be provided in a portion of the stator core located on the uppermost side in the vertical direction. In this case, the upper fixing portion may be arranged to project to the directly upper side in the vertical direction. In addition, in this case, the first refrigerant injection portion, and the third refrigerant injection portion different from the first refrigerant injection portion may be located above the stator core in the vertical direction and may be arranged to sandwich the upper fixing portion in the circumferential direction. The third refrigerant injection portion has the injection port to inject the oil O into the stator core. In addition, in this case, the first refrigerant injection portion and the third refrigerant injection portion may be arranged in line symmetry to sandwich an imaginary line, which passes through the motor axis and extends in the vertical direction, as viewed in the axial direction of the motor axis. In addition, in this case, a direction in which the first injection port of the first refrigerant injection portion is open and a direction in which the injection port of the third refrigerant injection portion is open may be a direction facing the directly lower side in the vertical direction. The opening area of the injection port of the third refrigerant injection portion may be the same as or different from the opening area of the first injection port.

The first support portion does not necessarily have the first through groove. The second support portion does not necessarily have the second through groove. The support portion does not necessarily include one of the first support portion and the second support portion. The support portion is not necessarily provided.

Drive apparatuses according to preferred embodiments of the present invention are not limited to particular apparatuses as long as they are capable of moving a target object using a motor as a power source. A drive apparatus according to a preferred embodiment of the present invention may not include a transmission mechanism. A torque of the motor may be directly outputted from a shaft of the motor to the target object. In this case, the drive apparatus corresponds to the motor itself. The direction in which the motor axis extends is not particularly limited as long as being a direction that intersects the vertical direction. Note that, when the motor axis is herein described as extending in a horizontal direction perpendicular to the vertical direction, the motor axis may extend exactly in the horizontal direction or substantially in the horizontal direction. That is, when the motor axis is herein described as extending in a horizontal direction perpendicular to the vertical direction, the motor axis may be slightly angled with respect to the horizontal direction. In addition, the case where the drive apparatus does not include any inverter unit has been described in the above-described preferred embodiments, but the present invention is not limited thereto. The drive apparatus may include an inverter unit. In other words, the drive apparatus may be integrated with the inverter unit.

Drive apparatuses according to preferred embodiments of the present invention may be used for any desired purpose. A drive apparatus according to a preferred embodiment of the present invention may not be installed in a vehicle.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus comprising:
   a motor having
      a rotor rotatable about a motor axis extending in an axial direction intersecting a vertical direction, and
      a stator core located radially outside the rotor;
   a housing that houses the motor inside; and
   a first refrigerant injection portion having an injection port configured to inject a refrigerant into the stator core,
   wherein the stator core includes:
      a cylindrical stator core body having an outer circumferential surface surrounding the rotor; and
      a fixing portion projecting radially outward from the cylindrical stator core body and fixed to the housing,
   the fixing portion includes an upper fixing portion projecting upward in the vertical direction from the cylindrical stator core body,
   the injection port includes a first injection port that is located on a lower side in the vertical direction with respect to an upper end portion of the upper fixing portion on an upper side in the vertical direction,
   the upper fixing portion is located on one circumferential side of the first injection port, and
   an opening of the first injection port faces a first direction facing a directly lower side in a radial direction of the rotor, or a second direction that is angled to the one circumferential side with respect to the radial direction, and
   the opening of the first injection port faces a portion located on the other circumferential side of a boundary with an end portion of the upper fixing portion on the other circumferential side on the outer circumferential surface of the cylindrical stator core body.

2. The drive apparatus according to claim 1, wherein the opening of the first injection port faces the second direction that is angled to the one circumferential side with respect to the radial direction.

3. The drive apparatus according to claim 1, wherein the housing has a motor housing portion that surrounds the stator core from radially outside,
   the upper fixing portion is arranged away from an inner peripheral surface of the motor housing portion, and
   a first radial distance between the upper fixing portion and the inner peripheral surface of the motor housing portion is at least partly smaller than a second radial distance between the boundary and the inner peripheral surface of the motor housing portion.

4. The drive apparatus according to claim 1, wherein a surface of the upper fixing portion on the other circumferential side is located on the lower side in the vertical direction toward the other circumferential side.

5. The drive apparatus according to claim 1, wherein a surface of the upper fixing portion on the other circumferential side is a curved surface and is smoothly joined to the outer circumferential surface of the cylindrical stator core body at the boundary.

6. The drive apparatus according to claim 1, wherein the upper end portion of the upper fixing portion on the upper side in the vertical direction is located on the one circumferential side with respect to a vertex of the cylindrical stator core body on the upper side in the vertical direction, and the first injection port is located on the other circumferential side with respect to the vertex.

7. The drive apparatus according to claim 1, wherein the housing has a support portion that comes into contact with the outer circumferential surface of the cylindrical stator core body, the support portion includes a first support portion located on the other circumferential side of the first refrigerant injection portion, and the first support portion has a first through groove that penetrates through the first support portion in a circumferential direction about the motor axis.

8. The drive apparatus according to claim 1, wherein the motor includes a coil assembly having a plurality of coils, the coil assembly has a coil end projecting from the stator core in the axial direction of the motor axis, and the first refrigerant injection portion includes a feed opening configured to feed the refrigerant to the coil end.

9. The drive apparatus according to claim 1, wherein the first refrigerant injection portion is a pipe extending in the axial direction of the motor axis.

10. The drive apparatus according to claim 1, wherein the injection port of the first refrigerant injection portion includes only the opening facing the second direction that is angled to the one circumferential side with respect to the radial direction.

11. The drive apparatus according to claim 1, wherein the injection port of the first refrigerant injection portion includes a third injection port that is open to the other circumferential side.

12. The drive apparatus according to claim 1, further comprising a second refrigerant injection portion having a further injection port configured to inject the refrigerant into the stator core, wherein the further injection port of the second refrigerant injection portion includes a second injection port that is open to the other circumferential side at a position on the one circumferential side of the upper fixing portion.

13. The drive apparatus according to claim 12, wherein the housing has a support portion that comes into contact with the outer circumferential surface of the cylindrical stator core body, and the support portion includes a second support portion located between the upper fixing portion and the second refrigerant injection portion in a circumferential direction about the motor axis.

14. The drive apparatus according to claim 13, wherein the second support portion has a second through groove that penetrates through the second support portion in the circumferential direction.

15. The drive apparatus according to claim 12, wherein the second refrigerant injection portion is a pipe extending in the axial direction of the motor axis.

16. A drive apparatus comprising:
a motor having
a rotor rotatable about a motor axis extending in an axial direction intersecting a vertical direction, and
a stator core located radially outside the rotor;
a housing that houses the motor inside; and
a first refrigerant injection portion having an injection port configured to inject a refrigerant into the stator core, wherein the stator core includes:
a cylindrical stator core body having an outer circumferential surface surrounding the rotor; and
a fixing portion projecting radially outward from the cylindrical stator core body and fixed to the housing, the fixing portion includes an upper fixing portion projecting upward in the vertical direction from the cylindrical stator core body, the injection port includes a first injection port that is located on a lower side in the vertical direction with respect to an upper end portion of the upper fixing portion on an upper side in the vertical direction, the upper fixing portion is located on one circumferential side of the first injection port, and an opening of the first injection port faces a first direction that is angled to the one circumferential side with respect to a second direction facing the motor axis, and the opening of the first injection portion faces a portion located on the other circumferential side of a boundary with an end portion of the upper fixing portion on the other circumferential side on the outer circumferential surface of the cylindrical stator core body.

17. The drive apparatus according to claim 16, wherein the housing has a motor housing portion that surrounds the stator core from radially outside, the upper fixing portion is arranged away from an inner peripheral surface of the motor housing portion, and a first radial distance between the upper fixing portion and the inner peripheral surface of the motor housing portion is at least partly smaller than a second radial distance between the boundary and the inner peripheral surface of the motor housing portion.

18. The drive apparatus according to claim 16, wherein a surface of the upper fixing portion on the other circumferential side is located on the lower side in the vertical direction toward the other circumferential side.

19. The drive apparatus according to claim 18, wherein the boundary is located on the other circumferential side with respect to a vertex of the cylindrical stator core body on the upper side in the vertical direction, and a first portion of the outer circumferential surface of the cylindrical stator core body between the boundary and a second portion located radially inside the first injection port is located on the lower side in the vertical direction toward the other circumferential side.

20. A drive apparatus, comprising:
a motor having a rotor rotatable about a motor axis extending in a direction intersecting a vertical direction and a stator core located radially outside the rotor;
a housing that houses the motor inside; and
a first refrigerant injection portion having an injection port to inject a refrigerant into the stator core, wherein the stator core includes:
a cylindrical stator core body whose outer circumferential surface surrounds the rotor; and
a fixing portion that is arranged to project radially outward from the stator core body and is fixed to the housing, the fixing portion includes an upper fixing portion that is arranged to project upward in the vertical direction from the stator core body, the injection port includes a first injection port that is located on a lower side in the vertical direction with respect to an end portion of the upper fixing portion on an upper side in the vertical direction, the upper fixing portion is located on one circumferential side of the first injection port, a direction, in which the first injection port is open, is a direction facing a directly lower side in the vertical direction or a direction that is angled to the one circumferential side with respect to the direction facing the directly lower side in the vertical direction, and is a direction facing a portion located on the other circumferential side of a boundary with an end portion of the upper fixing portion on the other circumferential side on the outer circumferential surface of the stator core body, a surface of the upper fixing portion on the other circumferential side is located on the lower side in the vertical direction toward the other circumferential side, the boundary is located on the other circumferential side with respect to a vertex of the stator core body on the upper side in the vertical direction, and a portion of the outer circumferential surface of the stator core body between the boundary and a portion located radially inside the first injection port is located on the lower side in the vertical direction toward the other circumferential side.

\* \* \* \* \*